(12) United States Patent
Nagata

(10) Patent No.: US 8,588,995 B2
(45) Date of Patent: Nov. 19, 2013

(54) VEHICLE CONTROL DEVICE

(75) Inventor: Tatsuki Nagata, Kasugai (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 0 days.

(21) Appl. No.: 13/433,397

(22) Filed: Mar. 29, 2012

(65) Prior Publication Data

US 2012/0253553 A1    Oct. 4, 2012

(30) Foreign Application Priority Data

Apr. 1, 2011    (JP) .................................. 2011-081612

(51) Int. Cl.
| | | |
|---|---|---|
| G06F 7/00 | (2006.01) | |
| H04B 1/00 | (2006.01) | |
| H05B 37/02 | (2006.01) | |
| B60Q 1/14 | (2006.01) | |
| G01S 5/02 | (2010.01) | |

(52) U.S. Cl.
USPC ........ 701/2; 340/5.61; 340/539.32; 340/5.72; 340/8.1; 315/130; 315/153; 315/77

(58) Field of Classification Search
USPC ................. 701/2; 340/539.32, 5.72, 5.61, 8.1, 340/426.16; 315/130, 153, 77
See application file for complete search history.

(56) References Cited

U.S. PATENT DOCUMENTS

| | | |
|---|---|---|
| 7,429,922 B2 | 9/2008 | Teshima et al. |
| 8,089,342 B2 | 1/2012 | Sugiura et al. |
| 2007/0030165 A1 * | 2/2007 | Teshima et al. .......... 340/825.49 |
| 2007/0120644 A1 | 5/2007 | Seike |
| 2008/0157919 A1 * | 7/2008 | Sugiura et al. ............... 340/5.61 |
| 2009/0096578 A1 * | 4/2009 | Ogino et al. .................. 340/5.72 |
| 2011/0115375 A1 * | 5/2011 | Shiratsuchi et al. ............ 315/77 |
| 2011/0140839 A1 * | 6/2011 | DiSalvo et al. ............. 340/5.61 |
| 2012/0181934 A1 * | 7/2012 | Knibbe et al. ................ 315/130 |

FOREIGN PATENT DOCUMENTS

| | | |
|---|---|---|
| JP | 2002201838 A | 7/2002 |
| JP | 2008-163633 A | 7/2008 |
| JP | 2009203701 A | 9/2009 |
| JP | 2009258121 A * | 11/2009 |

OTHER PUBLICATIONS

English Patent Abstract of JP 2009-203701, Publication Date: Sep. 10, 2009 (1 Page).
English Patent Abstract of JP 2002-201838, Publication Date: Jul. 19, 2002 (1 Page).

* cited by examiner

*Primary Examiner* — Fadey Jabr
*Assistant Examiner* — Yazan A Soofi
(74) *Attorney, Agent, or Firm* — Osha Liang LLP

(57) ABSTRACT

A vehicle control device mounted on a vehicle for performing communication with a mobile device and performing predetermined control in accordance with communication contents with the mobile device, having a locking operation unit that locks or unlocks doors of the vehicle, interior signal transmitting and receiving units that detect a position of the mobile device left in an interior of the vehicle in a case where a locking operation is performed by the locking operation unit, and an interior lamp drive control unit that lights an interior lamp among a plurality of interior lamps provided in the interior of the vehicle, the interior lamp being close to the position of the mobile device based on information of the position detected by the interior signal transmitting and receiving units.

20 Claims, 16 Drawing Sheets

VEHICLE CONTROL DEVICE

BACKGROUND OF THE INVENTION

1. Technical Field

The present invention relates to a vehicle control device for performing communication with a mobile device and performing predetermined control by a remote control operation of the mobile device.

2. Related Art

Conventionally, there is a practically-used electronic key system for performing communication between a vehicle control device mounted on an automobile such as an ECU (Electronic Control Unit) and a BCM (Body Control Module) and a mobile type wireless transmitter owned by a driver (hereinafter, referred to as the "mobile device"), locking or unlocking passenger doors and the like and starting or stopping an engine in a case where the communication is established.

However, in this kind of electronic key system, in a case where the mobile device is lost in a vehicle interior, it is difficult to seek a place of the mobile device. Japanese Unexamined Patent Publication No. 2009-203701 listed later discloses an electronic key system for, in a case where a user (passenger) gets out of a vehicle leaving an electronic key (mobile device) in an interior of the vehicle and performs a locking operation, transmitting a signal for identifying the electronic key from an ECU (Electronic Control Unit) to the electronic key, and when existence of the electronic key is proved in the vehicle interior, actuating alarm means provided in the vehicle so as to notify the passenger that the electronic key is left.

However, in the electronic key system of Japanese Unexamined Patent Publication No. 2009-203701, even when the user becomes aware that the mobile device is left in the interior of the vehicle due to an alarm tone blown from a speaker, the user cannot identify where in the interior of the vehicle the mobile device is left based on the alarm tone. Therefore, finding the mobile device takes time. Particularly, at night or in a case where it is dark around the vehicle, the interior of the vehicle is less visible and search of the mobile device is not easily performed. Therefore, it is difficult to readily find out the mobile device with the electronic key system.

In an electronic key system disclosed in Japanese Unexamined Patent Publication No. 2008-163633 listed later, in a case where a user gets out of a vehicle leaving a mobile device in an interior of the vehicle and performs a locking operation, a signal for searching the mobile device is transmitted from an in-vehicle device to the mobile device. When existence of the mobile device is proved in the vehicle interior, by actuating notification means provided in the mobile device, a position of the mobile device is notified around.

Thereby, for example in a case where the notification means provided in the mobile device is sound release means such as a speaker, the sound means is actuated (blown) based on the search signal described above. Thus, by searching a sound source when seeking the missing mobile device, the mobile device can be found out.

In a case where the notification means is light emitting means such as a LED (Light Emitting Diode), the light emitting means blinks or lights based on the search signal described above. Thus, when seeking the missing mobile device at night or at a dark place, the mobile device can be readily found out.

In a case where the notification means is vibration means such as a vibrator, the vibration means is vibrated based on the search signal described above. Thus, by searching a vibration source when seeking the missing mobile device, the mobile device can be found out.

However, in the electronic key system of Japanese Unexamined Patent Publication No. 2008-163633, the notification means is actuated by using a power source device (such as a battery) built in the mobile device. Thus, electric power of the power source device of the mobile device is consumed. In comparison to a power source device (such as an in-vehicle battery) mounted in the vehicle, the power source device of the mobile device has a less electric power amount. Therefore, consumption of the electric power in the mobile device has to be suppressed as far as possible.

In a vehicle electronic key device disclosed in Japanese Unexamined Patent Publication No. 2002-201838 listed later, a plurality of transmitters is arranged in a vehicle, and by transmitting signals for searching a mobile device all together from these transmitters, a position of the mobile device in a vehicle interior is identified.

Thereby, for example, in a case where the position of the mobile device in the vehicle interior is identified, a text guide indicating the position of the mobile device is displayed in a predetermined display area provided in a meter display. In a vehicle in which a navigation device is mounted, by utilizing image guide and voice guide functions of the navigation device, an image indicating the position of the mobile device is displayed on a display or a voice message indicating the position of the mobile device is produced from a speaker.

However, in the vehicle electronic key device of Japanese Unexamined Patent Publication No. 2002-201838, in order to utilize the text guide, the image guide, the voice guide indicating the position of the mobile device, there is a need for pushing a push type engine switch to turn a power source into an "ACC (accessory)" or "ON" state and bring the meter display and the navigation device into a usable state. After the mobile device is found out, there is a need for turning the power source into an "OFF" state. Therefore, with the above vehicle electronic key device, usability of a user is unfavorable.

SUMMARY

One or more embodiments of the present invention provides a vehicle control device capable of intuitively and readily finding out a mobile device upon searching the mobile device in a vehicle interior.

According to one or more embodiments of the present invention, a vehicle control device mounted on a vehicle for performing communication with a mobile device and performing predetermined control in accordance with communication contents with the mobile device, includes operation means for locking or unlocking doors of the vehicle, position detection means for detecting a position of the mobile device left in an interior of the vehicle in a case where a locking operation is performed by the operation means, and interior lamp control means for lighting an interior lamp among a plurality of interior lamps provided in the interior of the vehicle, the interior lamp being close to the position of the mobile device based on information of the position detected by the position detection means.

It should be noted that "lighting" in one or more embodiments of the present invention is a concept including not only continuous lighting but also intermittent lighting, that is, "blinking".

In such a way, when the operation for locking the doors is performed in a state that the mobile device is in the interior, the interior lamp close to the position of the mobile device is lit. Therefore, by confirming a lighting state and a lighting position of the interior lamp, a user can readily confirm whether or not the mobile device is left and where the mobile device is left. Particularly, when it is dark in an exterior of the vehicle, that is, when the mobile device is not easily found out in an exterior environment, the interior lamp brightens a place close to the position of the mobile device. Thus, the mobile device is more easily found out. Even when a power source of the vehicle is in an "OFF" state, the interior lamp is lit. Thus, usability of the user is favorable. Further, operations for notifying of the position of the mobile device such as sound release and light emission are not performed on the side of the mobile device. Thus, an electric power consumption amount of the mobile device can be suppressed.

In the vehicle control device according to one or more embodiments of the present invention, the interior lamp control means may light only an interior lamp among the plurality of interior lamps, the interior lamp being the closest to the position of the mobile device.

In such a way, by confirming a position of the interior lamp which is solely lit in the vehicle interior, the position of the mobile device is more easily identified. Thus, the mobile device can be readily found out.

In the vehicle control device according to one or more embodiments of the present invention, the interior lamp control means may light plural interior lamps among the plurality of interior lamps, the interior lamps being close to the position of the mobile device.

In such a way, a place close to the position of the mobile device is brightened by the plurality of lit interior lamps. Thus, when it is dark in the exterior of the vehicle, that is, when the mobile device is not easily found out in an exterior environment, the mobile device is more easily found out.

In the vehicle control device according to one or more embodiments of the present invention, the plurality of interior lamps may be provided corresponding to rows of a plurality of seats arranged in the interior of the vehicle on the upper side of the rows. The interior lamp control means may light only an interior lamp among the plurality of interior lamps provided on the upper side of the rows, the interior lamp being the closest to the position of the mobile device based on the information of the position detected by the position detection means.

In such a way, a place (region) at which the mobile device is placed can be identified based on the row of the seat corresponding to the lit interior lamp. Thus, the mobile device can be more readily found out. By providing the interior lamps on the upper side of the rows of the seats, when the interior is confirmed from the exterior, the lighting state of the interior lamps can be easily confirmed.

In the vehicle control device according to one or more embodiments of the present invention, the plurality of interior lamps may be provided respectively corresponding to a plurality of seats arranged in the interior of the vehicle on the upper side of the seats. The interior lamp control means may light only an interior lamp among the plurality of interior lamps provided on the upper side of the seats, the interior lamp being the closest to the position of the mobile device based on the information of the position detected by the position detection means.

In such a way, the place (region) at which the mobile device is placed can be identified within a narrower range based on the seat corresponding to the lit interior lamp. Thus, the mobile device can be more readily found out. By providing the interior lamps on the upper side of the seats, when the interior is confirmed from the exterior, the lighting state of the interior lamps can be easily confirmed.

In the vehicle control device according to one or more embodiments of the present invention, the plurality of interior lamps may be provided respectively corresponding to a plurality of seats arranged in the interior of the vehicle on the side of the seats. The interior lamp control means may light only an interior lamp among the plurality of interior lamps provided on the side of the seats, the interior lamp being the closest to the position of the mobile device based on the information of the position detected by the position detection means.

In such a way, the place (region) at which the mobile device is placed can be identified within a narrower range based on the seat corresponding to the lit interior lamp. Thus, the mobile device can be more readily found out. By providing the interior lamps on the side of the seats, light of the interior lamps can also be prevented from being blocked by a body of a searcher (user).

In the vehicle control device according to one or more embodiments of the present invention, the plurality of interior lamps may be provided respectively corresponding to a plurality of seats arranged in the interior of the vehicle on the lower side of the seats. The interior lamp control means may light only an interior lamp among the plurality of interior lamps provided on the lower side of the seats, the interior lamp being the closest to the position of the mobile device based on the information of the position detected by the position detection means.

In such a way, the place (region) at which the mobile device is placed can be identified within a narrower range based on the seat corresponding to the lit interior lamp. Thus, the mobile device can be more readily found out. In a case where the position of the mobile device is on the lower side of the seats, a part below the seats can be more brightened. Thus, when it is dark in the exterior of the vehicle, that is, when the mobile device is not easily found out in the exterior environment, the mobile device is more easily found out.

The vehicle control device according to one or more embodiments of the present invention may further include timekeeping means. The time keeping means may start timekeeping based on lighting of the interior lamp by the interior lamp control means, and the interior lamp control means may turn off the lit interior lamp in a case where a timekeeping time by the timekeeping means exceeds a predetermined time.

In such a way, even in a case where the user gets away from the vehicle while not knowing that the mobile device is left, by turning off the lit interior lamp after a predetermined time, the left mobile device can be prevented from being detected from the outside. That is, theft from the vehicle is prevented. By turning off the lit interior lamp after a predetermined time, wasteful consumption of the electric power (dead battery) can be prevented.

In the vehicle control device according to one or more embodiments of the present invention, the interior lamp control means may light the interior lamp close to the position of the mobile device only in a case where after the position detection means detects the position of the mobile device, an operation of the operation means is performed.

In such a way, even in a case where the user gets away from the vehicle while not knowing that the mobile device is left, the left mobile device can be prevented from being detected from the outside due to lighting of the interior lamp. That is, the theft from the vehicle is prevented. In a case where the user returns to the vehicle and operates the operation means, the interior lamp close to the position of the mobile device is lit. Thus, the user can be notified that the mobile device is left.

The vehicle control device according to one or more embodiments of the present invention may further include open/close detection means for detecting opening/closing of the doors of the vehicle, and the interior lamp control means may light the interior lamp only in a case where after the position detection means detects the position of the mobile device, the open/close detection means detects that the doors of the vehicle are opened.

In such a way, even in a case where the user gets away from the vehicle while not knowing that the mobile device is left, the left mobile device can be prevented from being detected from the outside due to lighting of the interior lamp. That is, the theft from the vehicle is prevented. In a case where the user returns to the vehicle and opens the door of the vehicle, the interior lamp close to the position of the mobile device is lit. Thus, the user can be notified that the mobile device is left.

According to one or more embodiments of the present invention, the vehicle control device capable of readily finding out the mobile device upon searching the mobile device in the vehicle interior, and suppressing the electric power consumption amount of the mobile device with favorable usability of the user can be provided.

DETAILED DESCRIPTION

Figure 1:
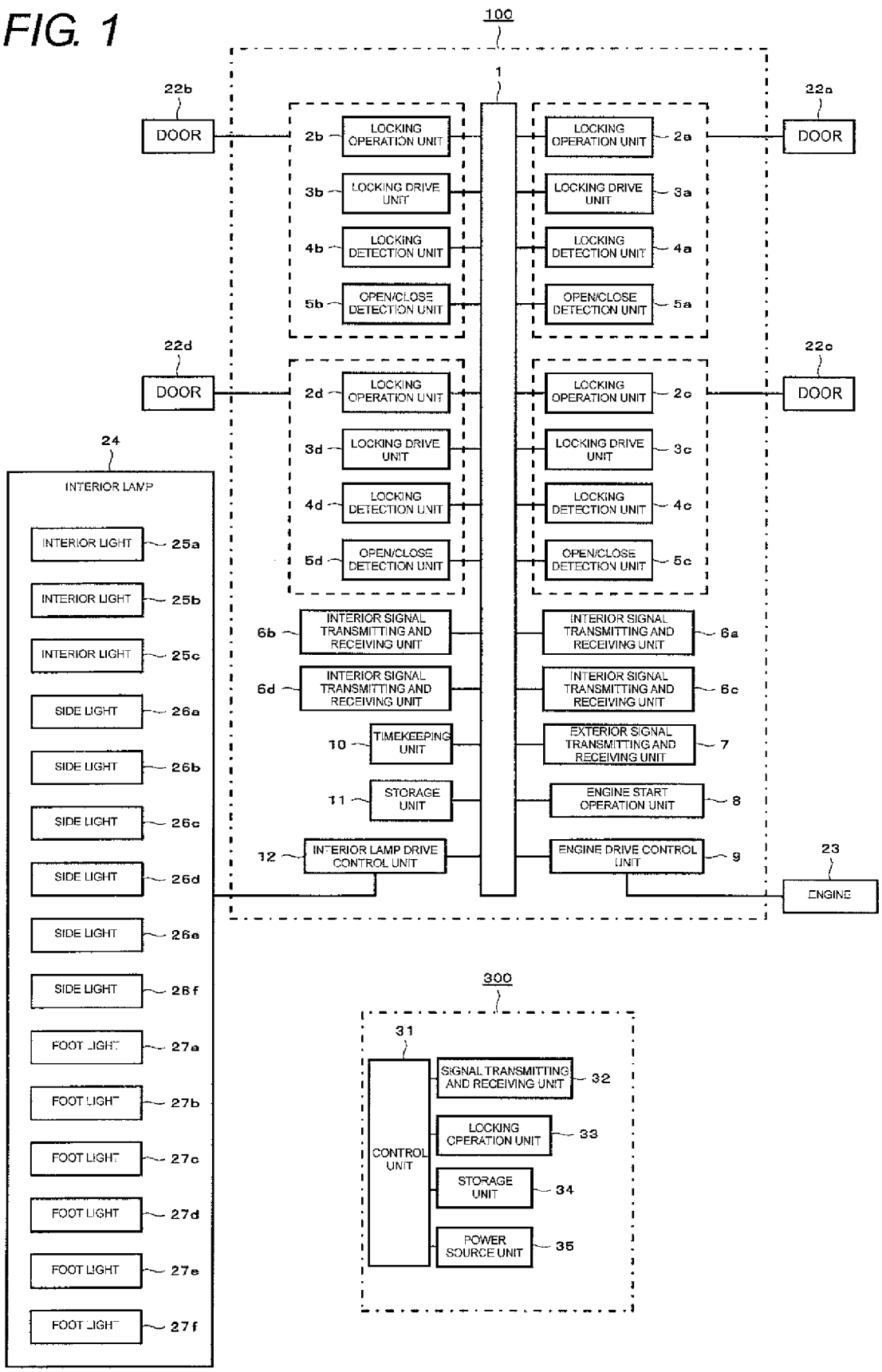
FIG. 1 is a block diagram showing a vehicle control device according to embodiments of the present invention, and a mobile device for remotely controlling the vehicle control device.

Hereinafter, embodiments of the present invention will be described with reference to the drawings. It should be noted that in the following drawings, the same parts or corresponding parts will be given the same reference characters. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

FIG. 1 is a block diagram showing a vehicle control device 100 according to one or more embodiments of the present invention. FIG. 1 also includes a block diagram showing a mobile type wireless transceiver (hereinafter, referred to as the "mobile device") 300 used in a case where operations required for executing various control by the vehicle control device 100 are remotely performed.

Figure 2:
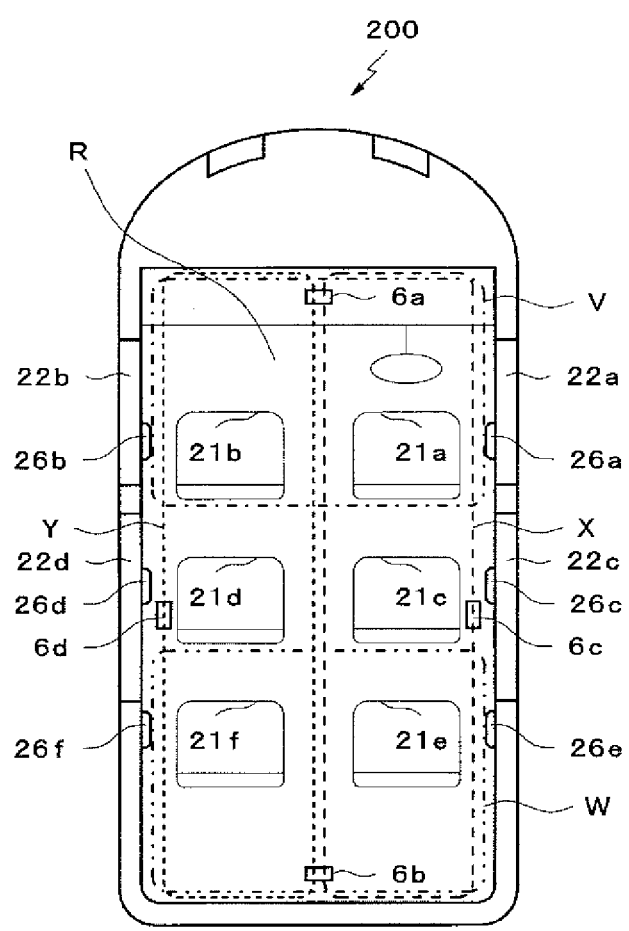
FIG. 2 is a top view showing an interior of a vehicle to which the vehicle control device of FIG. 1 is applied.

The vehicle control device 100 is, for example, mounted on a vehicle 200 shown in FIG. 2 or the like. The vehicle control device 100 controls doors 22a to 22d for a passenger to get on and off seats 21a to 21d (FIG. 2), an engine 23 for driving the vehicle 200, interior lamps 24 provided in an interior of the vehicle 200 (hereinafter, referred to as the "vehicle interior R"), and the like.

The mobile device 300 executes, for example, operations relating to locking and unlocking of the doors 22a to 22d. That is, the mobile device 300 has a function as an electronic key.

As shown in FIG. 1, the vehicle control device 100 has a control unit 1, locking operation units 2a to 2d, locking drive units 3a to 3d, locking detection units 4a to 4d, open/close detection units 5a to 5d, interior signal transmitting and receiving units 6a to 6d, an exterior signal transmitting and receiving unit 7, an engine start operation unit 8, an engine drive control unit 9, a timekeeping unit 10, a storage unit 11, and an interior lamp drive control unit 12.

The vehicle control device 100 is formed by various devices (such as a battery) other than the devices described above. However, the devices are not shown in the drawings and description thereof is not given.

As shown in FIG. 1, the mobile device 300 has a control unit 31, a signal transmitting and receiving unit 32, a locking operation unit 33, a storage unit 34, and a power source unit 35.

The mobile device 300 is formed by various devices (such as a mechanical type key) other than the devices described above. However, the devices are not shown in the drawings and description thereof is not given.

A mobile device search system is formed by the vehicle control device 100 and the mobile device 300 described above.

Hereinafter, parts of the vehicle control device 100 will be firstly described. The control unit 1 is formed by, for example, a CPU (Central Processing Unit) or the like, and controls the parts of the vehicle control device 100.

Figure 5A:
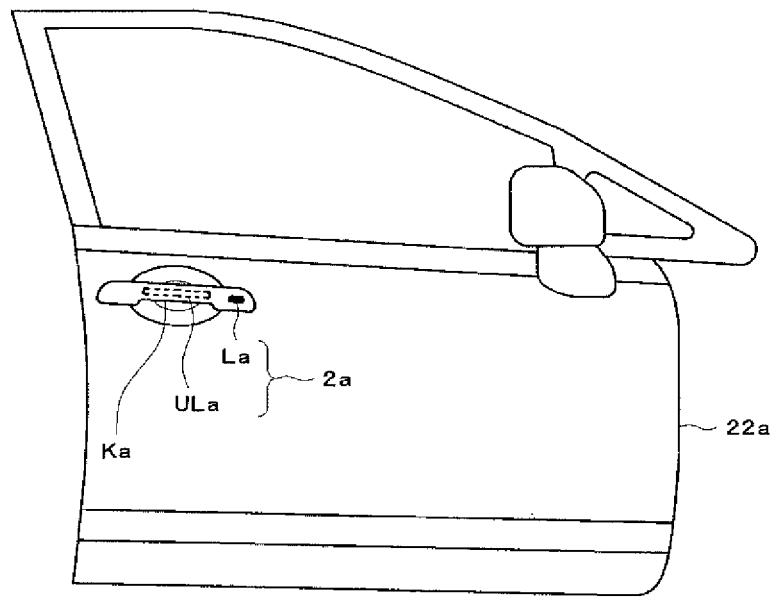
FIGS. 5A and 5B are views showing a detail of a door.

The locking operation units 2a, 2b are formed by, for example, press type buttons and the like. In detail, as shown in FIG. 5A, the locking operation unit 2a is formed by a locking button La provided on the surface side of a knob Ka on the outer side of the door 22a, an unlocking sensor ULa provided on the back side of the knob Ka, and a locking/unlocking switch (not shown) provided on the inner side of the door 22a.

Figure 5B:
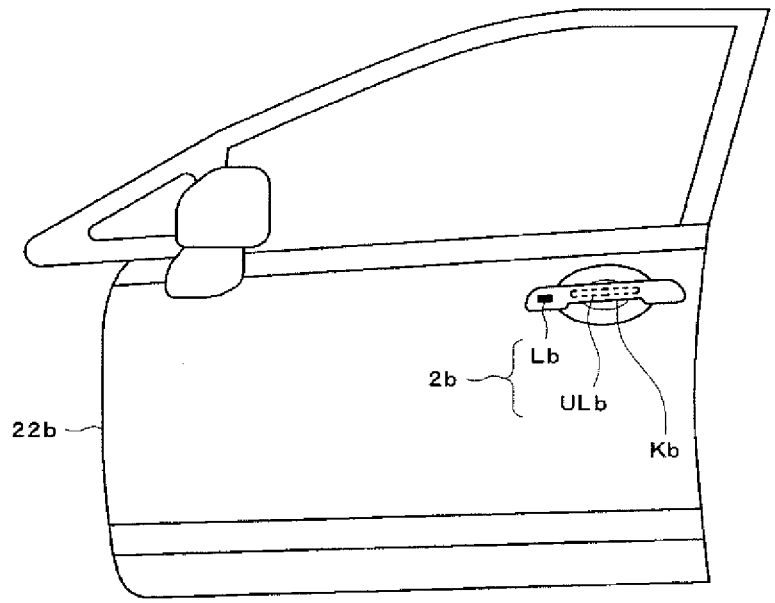

As shown in FIG. 5B, the locking operation unit 2b is formed by a locking button Lb provided on the surface side of a knob Kb on the outer side of the door 22b, an unlocking sensor ULb provided on the back side of the knob Kb, and a locking/unlocking switch (not shown) provided on the inner side of the door 22b.

When the locking operation units 2a, 2b are operated, an operation signal corresponding to the operation (a locking operation signal or an unlocking operation signal) is inputted to the control unit 1.

For example, when the locking operation is performed with the locking button La or the locking/unlocking switch provided on the inner side of the door 22a, a locking operation signal for locking the doors 22a to 22d is inputted to the control unit 1.

When the unlocking operation is performed with the unlocking sensor ULa or the locking/unlocking switch provided on the inner side of the door 22a, an unlocking operation signal for unlocking the doors 22a to 22d is inputted to the control unit 1.

When the locking operation is performed with the locking button Lb, a locking operation signal for locking the doors 22a to 22d is inputted to the control unit 1. When the unlocking operation is performed with the unlocking sensor ULb, an unlocking operation signal for unlocking the doors 22a to 22d is inputted to the control unit 11.

Further, when the locking operation is performed with the locking/unlocking switch provided on the inner side of the door 22b, a locking operation signal for locking only the door 22b is inputted to the control unit 1. When the unlocking operation is performed with the locking/unlocking switch provided on the inner side of the door 22b, an unlocking operation signal for unlocking only the door 22b is inputted to the control unit 1.

The locking operation units 2c, 2d are formed by, for example, press-type buttons and the like. In detail, the locking operation unit 2c is formed by a locking/unlocking switch (not shown) provided on the inner side of the door 22c. Similarly, the locking operation unit 2d is formed by a locking/unlocking switch (not shown) provided on the inner side of the door 22d.

For example, when the locking operation is performed with the locking/unlocking switch provided on the inner side of the door 22c, a locking operation signal for locking only the door 22c is inputted to the control unit 1. When the unlocking operation is performed with the locking/unlocking switch provided on the inner side of the door 22c, an unlocking operation signal for unlocking only the door 22c is inputted to the control unit 1.

When the locking operation is performed with the locking/unlocking switch provided on the inner side of the door 22d, a locking operation signal for locking only the door 22d is inputted to the control unit 1. When the unlocking operation is performed with the locking/unlocking switch provided on the inner side of the door 22d, an unlocking operation signal for unlocking only the door 22d is inputted to the control unit 1.

The locking drive units 3a to 3d are formed by, for example, lock mechanisms for locking/unlocking the doors 22a to 22d, motors for driving the lock mechanisms, and the like. The locking drive units 3a to 3d lock/unlock the doors 22a to 22d in accordance with operation contents in the locking operation units 2a to 2d or the locking operation unit 33 of the mobile device 300 described later under control of the control unit 1.

The locking detection units 4a to 4d are formed by, for example, switches and the like. The locking detection unit 4a detects whether or not the door 22a is in a locked state, and the locking detection unit 4b detects whether or not the door 22b is in a locked state. Similarly, the locking detection unit 4c detects whether or not the door 22c is in a locked state, and the locking detection unit 4d detects whether or not the door 22d is in a locked state.

The open/close detection units 5a to 5d are formed by, for example, open/close sensors and the like. The open/close detection unit 5a detects whether or not the door 22a is in a closed state, and the open/close detection unit 5b detects whether or not the door 22b is in a closed state. Similarly, the open/close detection unit 5c detects whether or not the door 22c is in a closed state, and the open/close detection unit 5d detects whether or not the door 22d is in a closed state.

The interior signal transmitting and receiving units 6a to 6d are formed by, for example, antennas and the like. As shown in FIG. 2, the interior signal transmitting and receiving unit 6a is provided in a front part of the vehicle interior R, and the interior signal transmitting and receiving unit 6b is provided in a rear part of the vehicle interior R. The interior signal transmitting and receiving unit 6c is provided on the right side of a center part of the vehicle interior R, and the interior signal transmitting and receiving unit 6d is provided on the left side of the center part of the vehicle interior R.

A communication range of the interior signal transmitting and receiving unit 6a is limited to the front part of the vehicle interior R, and the communication range is within a region surrounded by a one-chain line V shown in FIG. 2. In detail, the communication range of the interior signal transmitting and receiving unit 6a covers every corner of the front part of the vehicle interior R including first row seats (seats 21a, 21b).

A communication range of the interior signal transmitting and receiving unit 6b is limited to the rear part of the vehicle interior R, and the communication range is within a region surrounded by a double-chain line W shown in FIG. 2. In detail, the communication range of the interior signal transmitting and receiving unit 6b covers every corner of the rear part of the vehicle interior R including third row seats (seats 21e, 21f).

A communication range of the interior signal transmitting and receiving unit 6c is limited to a right part of the vehicle interior R, and the communication range is within a region surrounded by a broken line X shown in FIG. 2. In detail, the communication range of the interior signal transmitting and receiving unit 6c covers every corner of the right part of the vehicle interior R including seats in the right part of the vehicle interior R (seats 21a, 21c, 21e).

A communication range of the interior signal transmitting and receiving unit 6d is limited to a left part of the vehicle interior R, and the communication range is within a region surrounded by a dot line Y shown in FIG. 2. In detail, the communication range of the interior signal transmitting and receiving unit 6d covers every corner of the left part of the vehicle interior R including seats in the left part of the vehicle interior R (seats 21b, 21d, 21f).

As described above, the communication ranges of the interior signal transmitting and receiving units 6a to 6d cover every corner of the vehicle interior R. Therefore, when the mobile device 300 is in the vehicle interior R, the interior signal transmitting and receiving units 6a to 6d can communicate with the mobile device 300.

The interior signal transmitting and receiving units 6a to 6d formed as above transmit search signals for searching whether or not the mobile device 300 is within the respective communication ranges under the control of the control unit 1. Further, the interior signal transmitting and receiving units 6a to 6d receive predetermined signals transmitted from the mobile device 300. It should be noted that a detail of the signals transmitted from the mobile device 300 to the interior signal transmitting and receiving units 6a to 6d will be described later.

The exterior signal transmitting and receiving unit 7 is formed by, for example, an antenna and the like. The exterior signal transmitting and receiving unit 7 is provided in, for example, a roof RF (FIGS. 3A and 3B) of the vehicle 200.

Figure 3A:
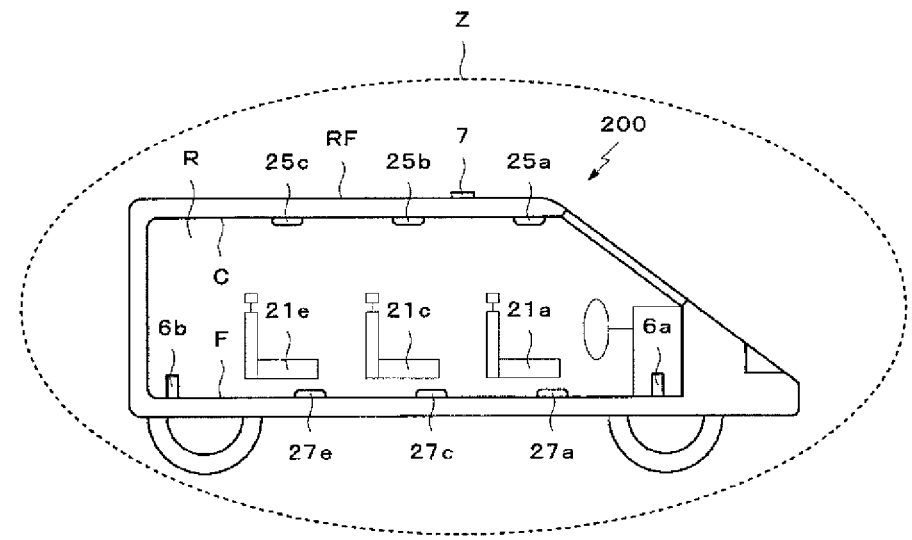
FIGS. 3A and 3B are views seen from the right side and left side showing the interior of the vehicle to which the vehicle control device of FIG. 1 is applied.
Figure 3B:
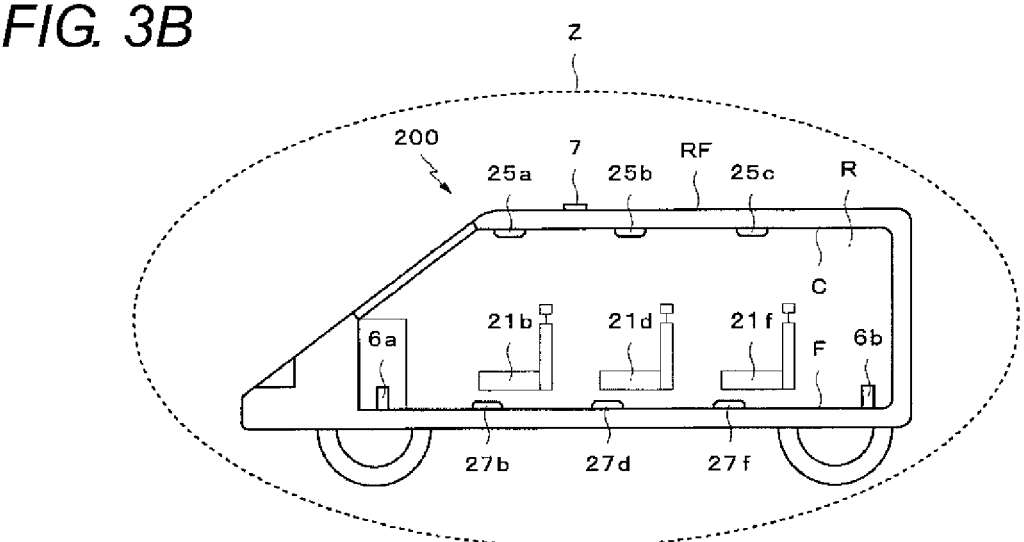

A communication range of the exterior signal transmitting and receiving unit 7 is limited to an exterior of the vehicle 200, and the communication range is within a region surrounded by a dot line Z shown in FIGS. 3A and 3B. Therefore, when the mobile device 300 is in the exterior of the vehicle 200 and within the region surrounded by the dot line Z, the exterior signal transmitting and receiving unit 7 can communicate with the mobile device 300.

The exterior signal transmitting and receiving unit 7 as above transmits a search signal for searching whether or not the mobile device 300 is within the above communication range under the control of the control unit 1. Further, the exterior signal transmitting and receiving unit 7 receives a predetermined signal transmitted from the mobile device 300. It should be noted that a detail of the signal transmitted from the mobile device 300 to the exterior signal transmitting and receiving unit 7 will be described later.

The engine start operation unit 8 is formed by, for example, a press type button or the like. When the engine start operation unit 8 is operated, an operation signal corresponding to the operation (an engine start signal or an engine stop signal) is inputted to the control unit 1.

The engine drive control unit 9 is formed by, for example, a calculation circuit, a control circuit, or the like. The engine drive control unit 9 calculates a fuel supply amount, a fuel injection timing, an ignition timing, or the like from the rotation number of the engine 23, a load applied to the engine 23, or the like, and drives and controls the engine 23 based on calculation results.

The timekeeping unit 10 is formed by, for example, a clock for indicating a current time, a timer for measuring an elapsed time, or the like.

The storage unit 11 is formed by, for example, an EEPROM (Electronically Erasable and Programmable Read Only Memory) or the like. In the storage unit 11, a control program for controlling the parts of the vehicle control device 100, various application software, specific ID (Identification) information for recognizing the mobile device 300 described later, and the like are preliminarily stored.

The interior lamp drive control unit 12 is formed by, for example, an ECU (Electronic Control Unit) for the interior lamps 24, a switch, or the like.

The interior lamps 24 are formed by interior lights 25a to 25c, side lights 26a to 26f, and foot lights 27a to 27f.

Figure 4A:
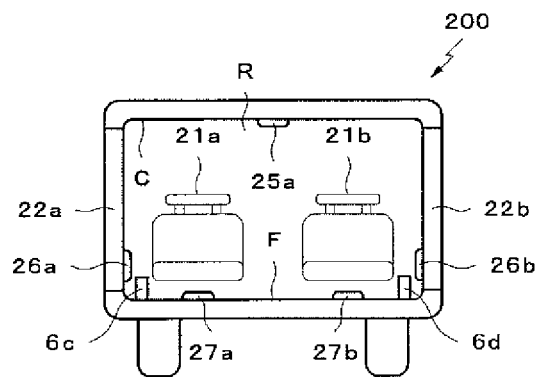
FIGS. 4A, 4B, and 4C are views seen from the front side showing the interior of the vehicle to which the vehicle control device of FIG. 1 is applied.
Figure 4B:
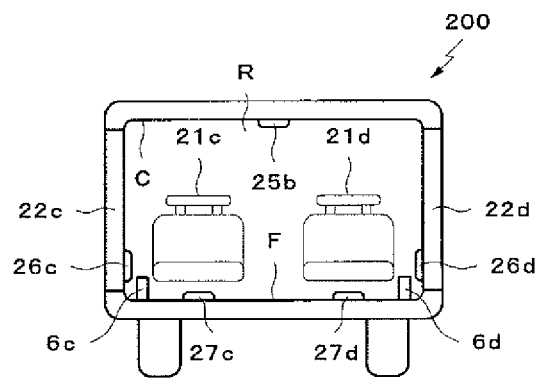

The interior lights 25a to 25c are provided respectively corresponding to rows of seats arranged in the longitudinal direction of the vehicle 200 on the upper side of the seat rows. For example, the interior light 25a is provided in a part of a ceiling C immediately above a first seat row (row of the seats 21a, 21b) as shown in FIGS. 3A, 3B, and 4A. The interior light 25b is provided in a part of the ceiling C immediately above a second seat row (row of the seats 21c, 21d) as shown in FIGS. 3A, 3B, and 4B. The interior light 25c is provided in a part of the ceiling C immediately above a third seat row (row of the seats 21e, 21f) as shown in FIGS. 3A, 3B, and 4C.

The side lights 26a to 26f are provided respectively corresponding to the plurality of seats (seats 21a to 21f) arranged in the width direction of the vehicle 200 on the side of seats. For example, the side light 26a is provided on the inner side of the door 22a for the passenger to get on and off the seat 21a as shown in FIGS. 2 and 4A. The side light 26b is provided on the inner side of the door 22b for the passenger to get on and off the seat 21b.

The side light 26c is provided on the inner side of the door 22c for the passenger to get on and off the seat 21c as shown in FIGS. 2 and 4B. The side light 26d is provided on the inner side of the door 22d for the passenger to get on and off the seat 21d.

Figure 4C:
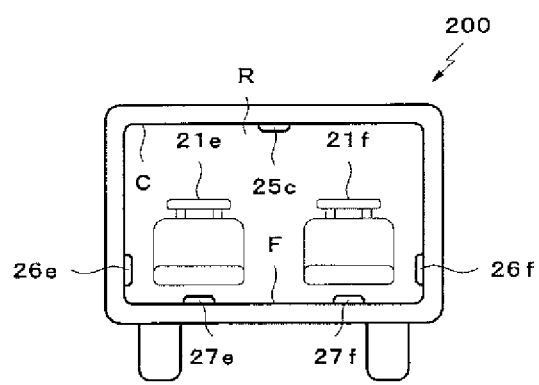

The side lights 26e, 26f are provided in inner side parts of the vehicle 200 facing the seats 21e, 21f as shown in FIGS. 2 and 4C.

The foot lights 27a to 27f are provided respectively corresponding to the plurality of seats (seats 21a to 21f) arranged in the width direction of the vehicle 200 on the lower side of (below) the seats. For example, the foot light 27a is provided in a part of a floor F immediately below the seat 21a as shown in FIGS. 3A and 4A. The foot light 27b is provided in a part of the floor F immediately below the seat 21b as shown in FIGS. 3B and 4A.

The foot light 27c is provided in a part of the floor F immediately below the seat 21c as shown in FIGS. 3A and 4B. The foot light 27d is provided in a part of the floor F immediately below the seat 21d as shown in FIGS. 3B and 4B.

The foot light 27e is provided in a part of the floor F immediately below the seat 21e as shown in FIGS. 3A and 4C. The foot light 27f is provided in a part of the floor F immediately below the seat 21f as shown in FIGS. 3B and 4C. It should be noted that the foot lights 27a to 27f may be provided respectively on bottom surfaces of the corresponding seats.

The interior lamp drive control unit 12 lights all the interior lights 25a to 25c based on detection of an opened state of the door 22a in the open/close detection unit 5a. Conversely, the interior lamp drive control unit 12 turns off all the interior lights 25a to 25c based on detection of a closed state of the door 22a in the open/close detection unit 5a.

It should be noted that the interior lamp drive control unit 12 also lights all the interior lights 25a to 25c in a case where any of the open/close detection units 5b to 5d detects an opened state of the door to be detected. The interior lamp drive control unit 12 turns off all the interior lights 25a to 25c in a case where any of the open/close detection units 5b to 5d detects a closed state of the door to be detected.

The interior lamp drive control unit 12 lights the side light 26a and the foot light 27a provided on the side and on the lower side of the seat 21a for the passenger to get on and off from the door 22a based on the detection of an opened state of the door 22a in the open/close detection unit 5a. Conversely, the interior lamp drive control unit 12 turns off the side light 26a and the foot light 27a based on the detection of a closed state of the door 22a in the open/close detection unit 5a.

Similarly, the interior lamp drive control unit 12 lights the side light 26b and the foot light 27b provided on the side and on the lower side of the seat 21b for the passenger to get on and off from the door 22b based on the detection of an opened state of the door 22b in the open/close detection unit 5b. Conversely, the interior lamp drive control unit 12 turns off the side light 26b and the foot light 27b based on the detection of a closed state of the door 22b in the open/close detection unit 5b.

Further, the interior lamp drive control unit 12 lights the side lights 26c, 26e and the foot lights 27c, 27e provided on the side and on the lower side of the seats 21c, 21e for the passenger to get on and off from the door 22c based on the detection of an opened state of the door 22c in the open/close detection unit 5c. Conversely, the interior lamp drive control unit 12 turns off the side lights 26c, 26e and the foot lights 27c, 27e based on the detection of a closed state of the door 22c in the open/close detection unit 5c.

Similarly, the interior lamp drive control unit 12 lights the side lights 26d, 26f and the foot lights 27d, 27f provided on the side and on the lower side of the seats 21d, 21f for the passenger to get on and off from the door 22d based on the detection of an opened state of the door 22d in the open/close detection unit 5d. Conversely, the interior lamp drive control unit 12 turns off the side lights 26d, 26f and the foot lights 27d, 27f based on the detection of a closed state of the door 22d in the open/close detection unit 5d.

In the above description, the locking operation units 2a to 2d are one embodiment of operation means. The open/close detection units 5a to 5d are one embodiment of open/close detection means. The interior signal transmitting and receiving units 6a to 6d are one embodiment of position detection means. The interior lamp drive control unit 12 is one embodiment of interior lamp control means. The timekeeping unit 10 is one embodiment of timekeeping means.

Next, parts of the mobile device 300 will be described.

The control unit 31 is formed by, for example, a CPU or the like, and controls the parts of the mobile device 300.

The signal transmitting and receiving unit 32 is formed by, for example, an antenna or the like. In a case of receiving the search signal transmitted from the side of the vehicle control device 100, the signal transmitting and receiving unit 32 transmits a reply signal to the search signal toward the vehicle control device 100. The signal transmitting and receiving unit 32 transmits an operation signal corresponding to an operation of the locking operation unit 33 described later toward the vehicle control device 100. It should be noted that a detail of the operation signal corresponding to the operation of the locking operation unit 33 will be described later.

The replay signal transmitted from the signal transmitting and receiving unit 32 is received by any one of the interior signal transmitting and receiving units 6a to 6d when the mobile device 300 is in the vehicle interior R (FIG. 2).

Figure 6:
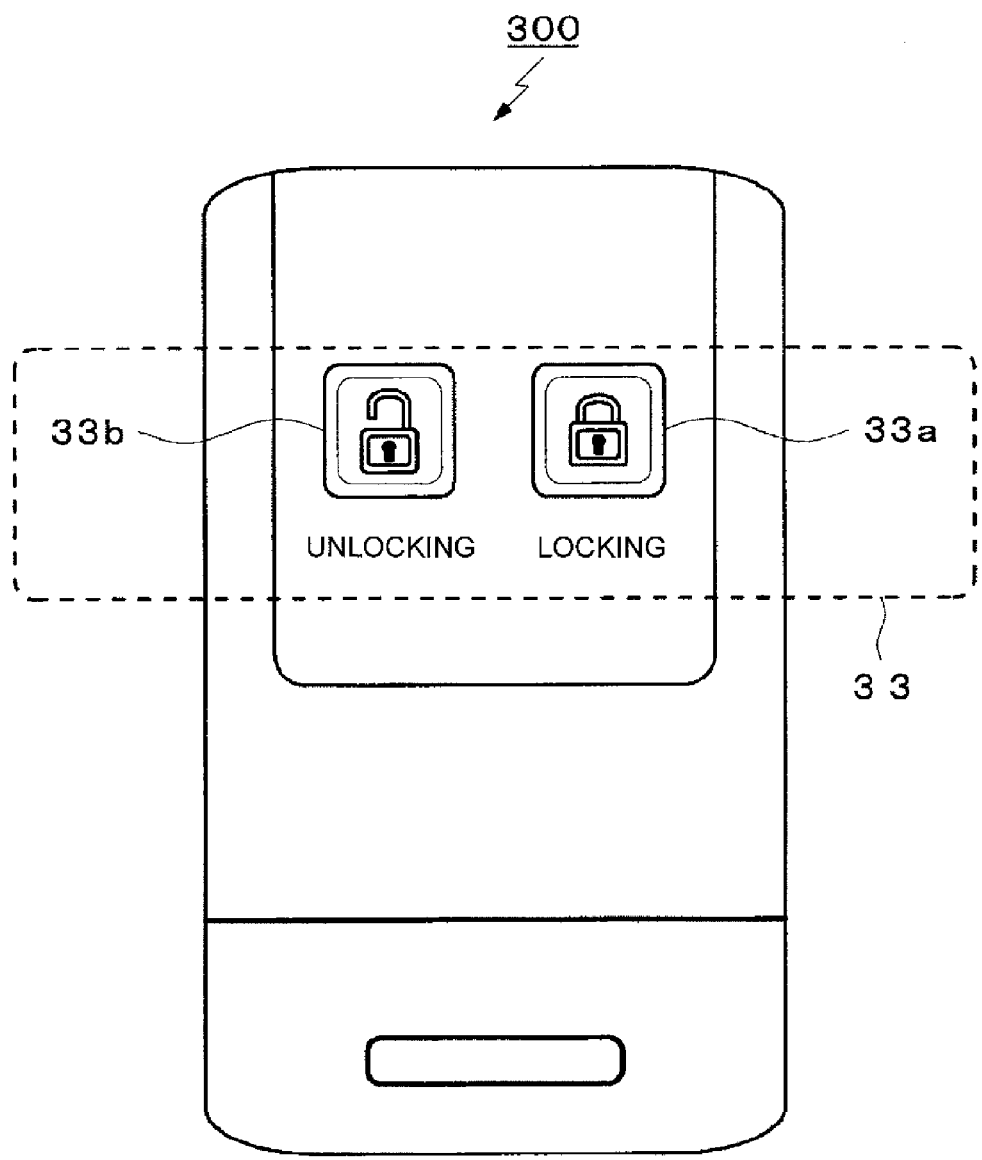
FIG. 6 is a view showing a detail of the mobile device.

The locking operation unit 33 is formed by, for example, press type buttons and the like. In detail, the locking operation unit 33 is formed by a locking button 33a and an unlocking button 33b provided on the surface side of the mobile device 300 (FIG. 6).

For example, when the locking button 33a is operated by a user in the exterior of the vehicle 200, a locking operation signal for locking the doors 22a to 22d all together is inputted to the control unit 31. The locking operation signal inputted to the control unit 31 is transmitted from the signal transmitting and receiving unit 32 and received by the exterior signal transmitting and receiving unit 7.

For example, when the unlocking button 33b is operated by the user in the exterior of the vehicle 200, an unlocking operation signal for unlocking the doors 22a to 22d all together is inputted to the control unit 31. The unlocking operation signal inputted to the control unit 31 is transmitted from the signal transmitting and receiving unit 32 and received by the exterior signal transmitting and receiving unit 7.

The storage unit 34 is formed by, for example, an EEPROM. Specific ID information of the mobile device 300 is preliminarily stored in the storage unit 34. When this ID information is transmitted to the vehicle control device 100, the mobile device 300 is recognized by the vehicle control device 100.

The power source unit 35 is, for example, a button type battery, and supplies electric power to the parts of the mobile device 300.

A series of actions in a case where the mobile device 300 is searched by the vehicle control device 100 in the mobile device search system including the vehicle control device 100 (FIG. 1) and the mobile device 300 (FIG. 1) as described above will be described with reference to flowcharts of FIGS. 13 to 15.

Figure 13:
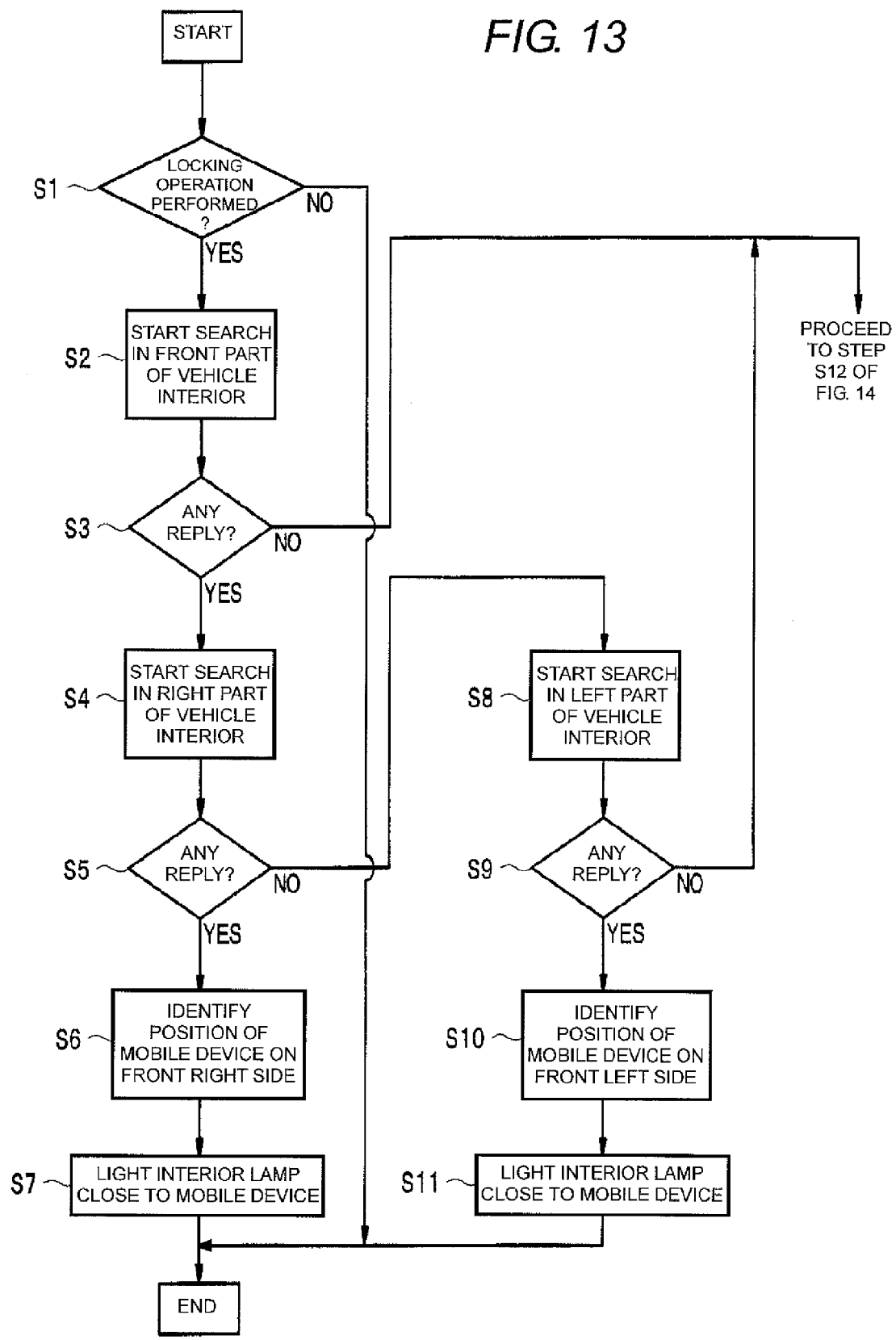
FIG. 13 is a flowchart showing actions at the time of searching the mobile device.

In Step S1 of FIG. 13, in a case where the locking operation is performed on the side of the vehicle 200 (FIG. 2) (Step S1: YES), the flow proceeds to Step S2. In a case where the locking operation is not performed on the side of the vehicle 200 (Step S1: NO), the flow is finished.

"YES" is chosen in Step S1 in a case where the locking button La provided in the knob Ka of the door 22a (refer to FIG. 5A) or the locking button Lb provided in the knob Kb of the door 22b (refer to FIG. 5B) is operated by the user.

It should be noted that at a time point when the locking operation is performed in Step S1, the doors 22a to 22d are not locked yet. In a case where search of the vehicle interior R described later determines that the mobile device 300 is not left, the doors 22a to 22d are locked all together. In a case where the search determines that the mobile device 300 is left, locking of the doors 22a to 22d is inhibited.

In Step S2, search in the front part of the vehicle interior R is started. This search is to perform a task of confirming whether or not the mobile device 300 is in the front part of the vehicle interior R, that is, whether or not the mobile device 300 is left.

In this case, the specific ID information for recognizing the mobile device 300 stored in the storage unit 11 is extracted under the control of the control unit 1. The search signal including the ID information is transmitted from the interior signal transmitting and receiving unit 6a provided in the front part of the vehicle interior R.

In Step S3, in a case where the mobile device 300 replies to the vehicle control device 100 (Step S3: YES), the flow proceeds to Step S4. In a case where there is no reply (Step S3: NO), the flow proceeds to Step S12 of FIG. 14.

"YES" is chosen in Step S3 in a case where the mobile device 300 is in the front part of the vehicle interior R (within the region of the one-chain line V of FIG. 2). "NO" is chosen in a case where the mobile device 300 is not in the front part of the vehicle interior R.

In a case where "YES" is chosen in Step S3, the search signal transmitted from the interior signal transmitting and receiving unit 6a is received by the signal transmitting and receiving unit 32 (FIG. 1) of the mobile device 300. The mobile device 300 examines whether or not the ID information included in the search signal received by the signal transmitting and receiving unit 32 matches with the ID information preliminarily stored in the storage unit 34 on the side of the mobile device 300 under control of the control unit 31.

In a case where the ID information matches as a result of the examination, the reply signal to the above search signal is transmitted from the signal transmitting and receiving unit 32 toward the interior signal transmitting and receiving unit 6a. By receiving this reply signal, the vehicle control device 100 can recognize that the mobile device 300 is in the front part of the vehicle interior R.

In Step S4, search for whether or not the mobile device 300 is in a right region within the front part of the vehicle interior R is started.

In this case, as well as Step S2 described above, the specific ID information for recognizing the mobile device 300 stored in the storage unit 11 is extracted under the control of the control unit 1. The search signal including the ID information is transmitted from the interior signal transmitting and receiving unit 6a.

A radio wave for disturbing the search signal transmitted from the interior signal transmitting and receiving unit 6a is transmitted from the interior signal transmitting and receiving unit 6d provided in the left part of the vehicle interior R. The disturbing radio wave in this case is, for example, a radio wave of an opposite phase with the same frequency as a radio wave of the search signal transmitted from the interior signal transmitting and receiving unit 6a (the same applies to disturbing radio waves in search of other regions described later).

Therefore, although the right region within the front part of the vehicle interior R is not influenced by the disturbing radio wave transmitted from the interior signal transmitting and receiving unit 6d, a left region is influenced by the disturbing radio wave transmitted from the interior signal transmitting and receiving unit 6d. Thus, a search range of the mobile device 300 in Step S4 is limited to the front right region of the vehicle interior R as shown by a shaded part in FIG. 7.

In Step S5, in a case where the mobile device 300 replies to the vehicle control device 100 (Step S5: YES), the flow proceeds to Step S6. In a case where there is no reply (Step S5: NO), the flow proceeds to Step S8.

"YES" is chosen in Step S5 in a case where the mobile device 300 is in the front right region of the vehicle interior R (shaded region of FIG. 7), and "NO" is chosen in a case where the mobile device is not in the front right region of the vehicle interior R.

In Step S6, based on the reply from the mobile device 300 in Step S3 (Step S3: YES) and the reply from the mobile device 300 in Step S5 (Step S5: YES), it is determined that the mobile device 300 is left in the vehicle interior R and a position of the mobile device 300 is identified to be a front right part of the vehicle interior R.

When it is determined that the mobile device 300 is left, as described above, all-together locking of the doors 22a to 22d based on the locking operation in Step S1 is inhibited. That is, the doors 22a to 22d remain unlocked. Thereby, in a case of becoming aware of lighting of the interior lamps 24, the user can immediately return to the vehicle interior R and search the mobile device 300.

In Step S7, an interior lamp among the interior lamps 24 (FIG. 1), the interior lamp being close to the position of the mobile device 300 (in the front right part) identified in Step S6 is lit. It should be noted that "lighting" also includes "blinking" (the same applies hereinafter).

In this case, a predetermined signal based on position information of the mobile device 300 is outputted from the control unit 1 to the interior lamp drive control unit 12.

As shown in FIG. 2, the first row seat 21a is in the front right region of the vehicle interior R, and the first row seat 21b is in a front left region of the vehicle interior R. The second row seat 21c is in a center right region of the vehicle interior R, and the second row seat 21d is in a center left region of the vehicle interior R. Further, the third row seat 21e is in a rear right region of the vehicle interior R, and the third row seat 21f is in a rear left region of the vehicle interior R.

Therefore, in a case where the interior lamp 24 close to the position of the mobile device 300 is lit, firstly, a signal including information of the seat close to the position of the mobile device 300 is outputted from the control unit 1 to the interior lamp drive control unit 12. Next, based on the received signal, the interior lamp drive control unit 12 drives and controls to light the interior lamp 24 provided on the upper side of the row of the seat close to the position of the mobile device 300, and the interior lamps 24 provided on the side and on the lower side of the seat.

Thus, in Step S7, a signal including information of the seat 21a close to the position of the mobile device 300 (in the front right part) is outputted from the control unit 1 to the interior lamp drive control unit 12. Based on this signal, the interior lamp drive control unit 12 drives and controls to light the interior light 25a provided on the upper side (ceiling C) of the row of the seat 21a (refer to FIG. 4A), the side light 26a provided on the side of the seat 21a (on the inner side of the door 22a), and the foot light 27a provided on the lower side (floor F), so as to light these interior lamps 24. When the above interior lamps 24 are lit, the flow is finished.

Figure 16A:
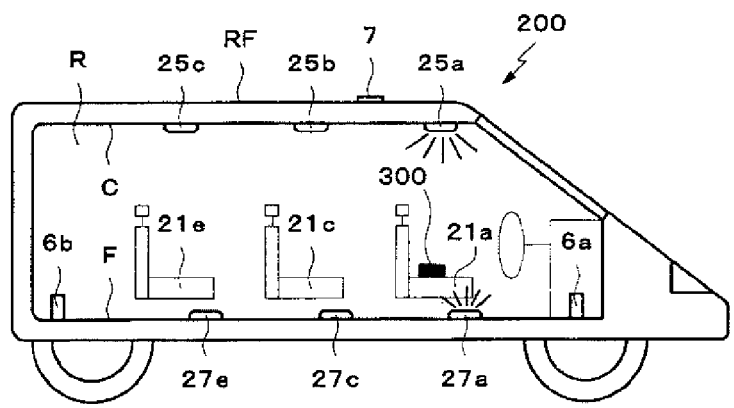
FIGS. 16A, 16B, and 16C are views showing a state that interior lamps corresponding to a position of the mobile device are lit.
Figure 16B:
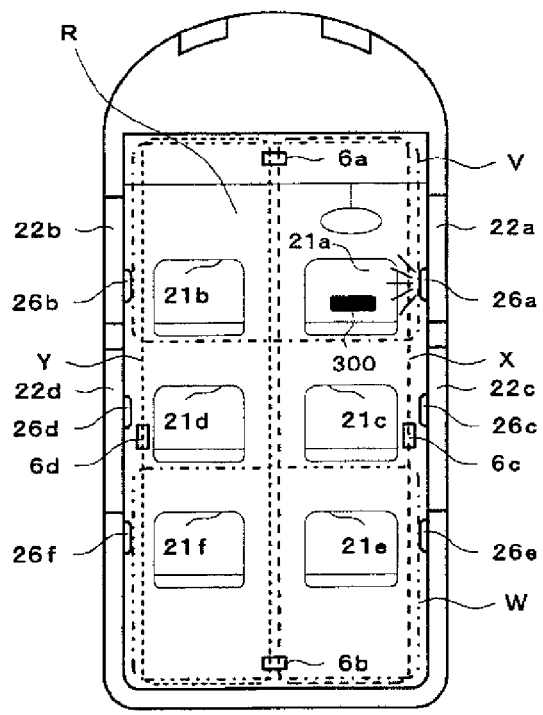
Figure 16C:
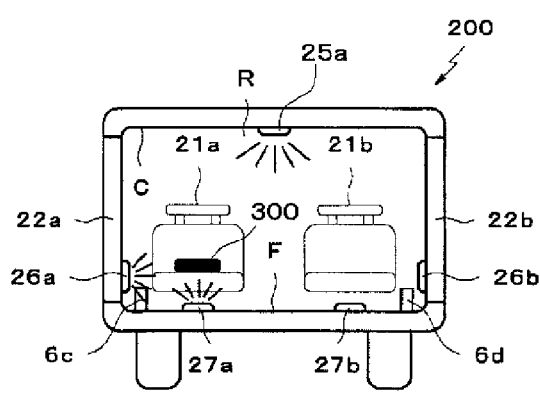

FIGS. 16A to 16C show a state that the interior light 25a on the upper side of the seat, the side light 26a on the side of the seat, and the foot light 27a on the lower side of the seat are respectively lit in a case where the mobile device 300 is left in the seat 21a. FIG. 16A is a side view, FIG. 16B is a plan view, and FIG. 16C is a front view.

It should be noted that although all the three lights 25a, 26a, 27a are lit, one or two of these lights may be lit.

Returning to Step S5, in a case where there is no reply from the mobile device 300 (Step S5: NO), the flow proceeds to Step S8, and search for whether or not the mobile device 300 is in the left region within the front part of the vehicle interior R is started.

In this case, as well as Step S2 described above, the specific ID information for recognizing the mobile device 300 stored in the storage unit 11 is extracted under the control of the control unit 1. The search signal including the ID information is transmitted from the interior signal transmitting and receiving unit 6a.

A radio wave for disturbing the search signal transmitted from the interior signal transmitting and receiving unit 6a is transmitted from the interior signal transmitting and receiving unit 6c provided in the right part of the vehicle interior R.

Figure 8:
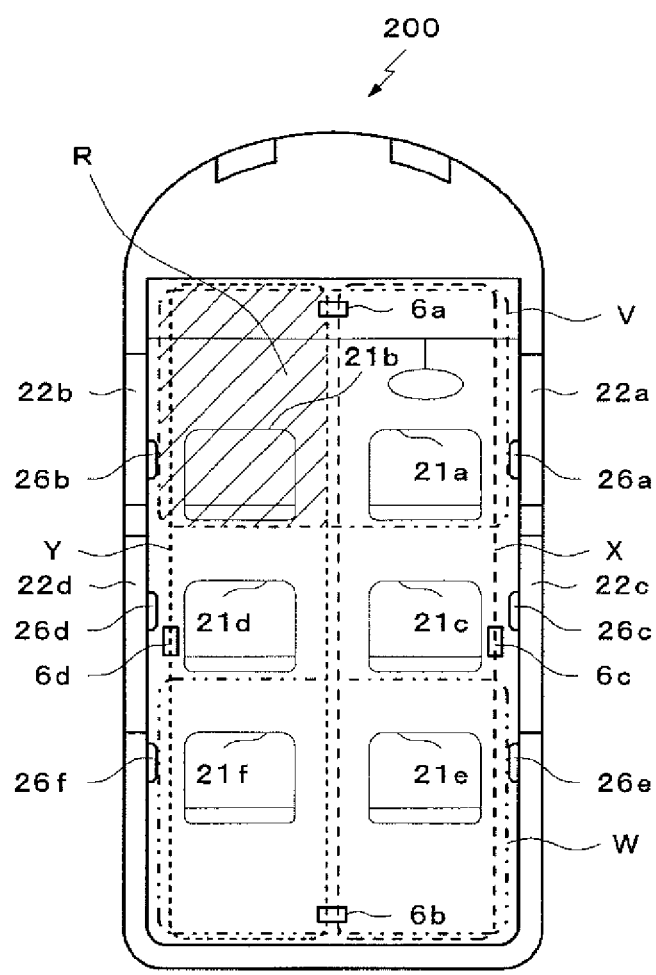
FIG. 8 is a view showing a search range of the mobile device.

Therefore, although the left region within the front part of the vehicle interior R is not influenced by the disturbing radio wave transmitted from the interior signal transmitting and receiving unit 6c, the right region is influenced by the disturbing radio wave transmitted from the interior signal transmitting and receiving unit 6c. Thus, a search range of the mobile device 300 in Step S8 is limited to the front left region of the vehicle interior R as shown by a shaded part in FIG. 8.

In Step S9, in a case where the mobile device 300 replies to the vehicle control device 100 (Step S9: YES), the flow proceeds to Step S10. In a case where there is no reply (Step S9: NO), the flow proceeds to Step S12 of FIG. 14.

"YES" is chosen in Step S9 in a case where the mobile device 300 is in the front left region of the vehicle interior R (shaded region of FIG. 8), and "NO" is chosen in a case where the mobile device is not in the front left region of the vehicle interior R.

However, in Step S5, it is already confirmed that the mobile device 300 is not in the front right part of the vehicle interior R (Step S5: NO). Therefore, in general, "NO" confirming that the mobile device 300 is neither in the front right part nor in a front left part of the vehicle interior R cannot be chosen in Step S9.

Thus, in a case of the above result, it is determined that "YES" is chosen in Step S3 because the mobile device 300 is in the vicinity of a border between the front part of the vehicle interior R and the center part of the vehicle interior R, the search signal transmitted from the interior signal transmitting and receiving unit 6a is coincidentally received by the mobile device 300, and the mobile device 300 replies. In order to continuously search the mobile device 300, the flow proceeds to Step S12 of FIG. 14.

In Step S10, based on the reply from the mobile device 300 in Step S3 (Step S3: YES) and the reply from the mobile device 300 in Step S9 (Step S9: YES), it is determined that the mobile device 300 is left in the vehicle interior R and the position of the mobile device 300 is identified to be the front left part of the vehicle interior R.

When it is determined that the mobile device 300 is left, the all-together locking of the doors 22a to 22d based on the locking operation in Step S1 is also inhibited.

In Step S11, an interior lamp among the interior lamps 24 (FIG. 1), the interior lamp being close to the position of the mobile device 300 (in the front left part) identified in Step S10 is lit.

In this case, the position of the mobile device 300 is identified to be the front left part of the vehicle interior R in Step S10. Thus, a signal including information of the first row seat 21b within the region is outputted from the control unit 1 to the interior lamp drive control unit 12.

Based on this signal, the interior lamp drive control unit 12 drives and controls to light the interior light 25a provided on the upper side (ceiling C) of the row of the seat 21b (refer to FIG. 4A), the side light 26b provided on the side of the seat 21b (on the inner side of the door 22b), and the foot light 27b provided on the lower side (floor F), so as to light these interior lamps 24. When the above interior lamps 24 are lit, the flow is finished.

Upon the search in the front part of the vehicle interior R, in a case where there is no reply from the mobile device 300 (Step S3: NO, Step S5: NO, and Step S9: NO), the flow proceeds to Step S12 of FIG. 14. In Step S12, search of the mobile device 300 in the rear part of the vehicle interior R is started.

In this case, as well as Step S2 and the like described above, the specific ID information for recognizing the mobile device 300 stored in the storage unit 11 is extracted under the control of the control unit 1. The search signal including the ID information is transmitted from the interior signal transmitting and receiving unit 6b provided in the rear part of the vehicle interior R.

In Step S13, in a case where the mobile device 300 replies to the vehicle control device 100 (Step S13: YES), the flow proceeds to Step S14. In a case where there is no reply (Step S13: NO), the flow proceeds to Step S22 of FIG. 15.

"YES" is chosen in Step S13 in a case where the mobile device 300 is in the rear part of the vehicle interior R (within the region of the double-chain line W of FIG. 2). "NO" is chosen in a case where the mobile device 300 is not in the rear part of the vehicle interior R.

In a case where "YES" is chosen in Step S13, the search signal transmitted from the interior signal transmitting and receiving unit 6b is received by the signal transmitting and receiving unit 32 (FIG. 2) of the mobile device 300. The mobile device 300 examines whether or not the ID information included in the search signal received by the signal transmitting and receiving unit 32 matches with the ID information preliminarily stored in the storage unit 34 on the side of the mobile device 300 under the control of the control unit 31.

In a case where the ID information matches as a result of the examination, the reply signal to the above search signal is transmitted from the signal transmitting and receiving unit 32 toward the interior signal transmitting and receiving unit 6b. By receiving this reply signal, the vehicle control device 100 can recognize that the mobile device 300 is in the rear part of the vehicle interior R.

In Step S14, search for whether or not the mobile device 300 is in a right region within the rear part of the vehicle interior R is started.

In this case, as well as Step S12 described above, the specific ID information for recognizing the mobile device 300 stored in the storage unit 11 is extracted under the control of the control unit 1. The search signal including the ID information is transmitted from the interior signal transmitting and receiving unit 6b.

A radio wave for disturbing the search signal transmitted from the interior signal transmitting and receiving unit 6b is transmitted from the interior signal transmitting and receiving unit 6d provided in the left part of the vehicle interior R.

Figure 9:
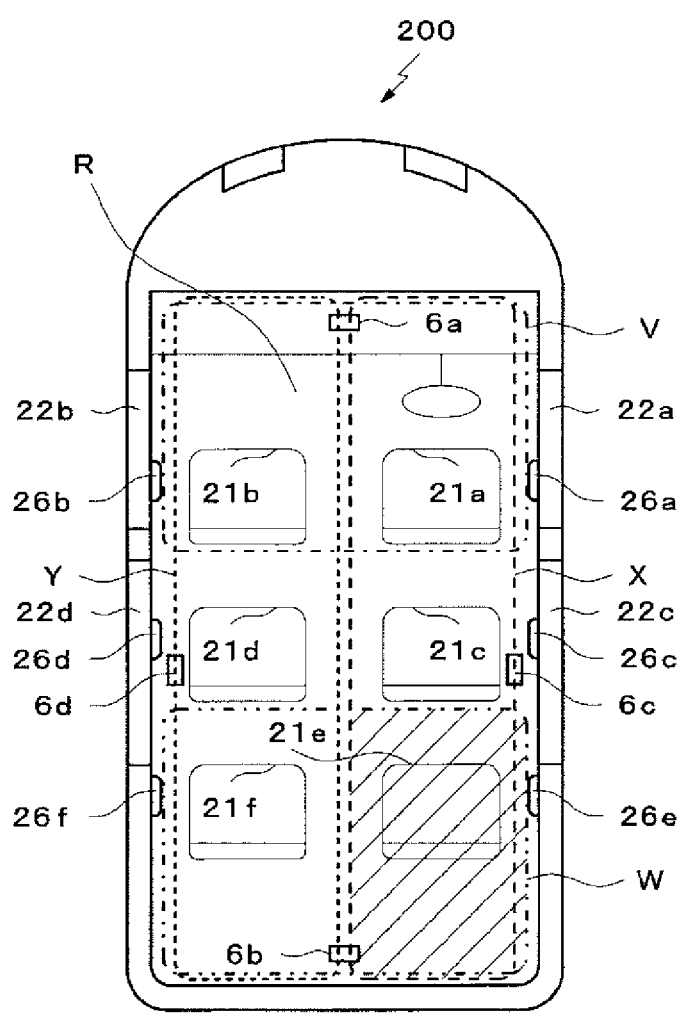
FIG. 9 is a view showing a search range of the mobile device.

Therefore, although the right region within the rear part of the vehicle interior R is not influenced by the disturbing radio wave transmitted from the interior signal transmitting and receiving unit 6d, a left region is influenced by the disturbing radio wave transmitted from the interior signal transmitting and receiving unit 6d. Thus, a search range of the mobile device 300 in Step S14 is limited to the rear right region of the vehicle interior R as shown by a shaded part in FIG. 9.

In Step S15, in a case where the mobile device 300 replies to the vehicle control device 100 (Step S15: YES), the flow proceeds to Step S16. In a case where there is no reply (Step S15: NO), the flow proceeds to Step S18.

"YES" is chosen in Step S15 in a case where the mobile device 300 is in the rear right region of the vehicle interior R (shaded region of FIG. 9), and "NO" is chosen in a case where the mobile device is not in the rear right region of the vehicle interior R.

In Step S16, based on the reply from the mobile device 300 in Step S13 (Step S13: YES) and the reply from the mobile device 300 in Step S15 (Step S15: YES), it is determined that the mobile device 300 is left in the vehicle interior R and the position of the mobile device 300 is identified to be in the rear right part of the vehicle interior R.

When it is determined that the mobile device 300 is left, the all-together locking of the doors 22a to 22d based on the locking operation in Step S1 is also inhibited.

In Step S17, an interior lamp among the interior lamps 24 (FIG. 1), the interior lamp being close to the position of the mobile device 300 (in the rear right part) identified in Step S16 is lit.

In this case, the position of the mobile device 300 is identified to be the rear right part of the vehicle interior R in Step S16. Thus, a signal including information of the third row seat 21e within the region is outputted from the control unit 1 to the interior lamp drive control unit 12.

Based on this signal, the interior lamp drive control unit 12 drives and controls to light the interior light 25c provided on the upper side (ceiling C) of the row of the seat 21e (refer to FIG. 4C), the side light 26e provided on the side of the seat 21e (on the inner side of the vehicle 200), and the foot light 27e provided on the lower side (floor F), so as to light these interior lamps 24. When the above interior lamps 24 are lit, the flow is finished.

Returning to Step S15, in a case where there is no reply from the mobile device 300 (Step S15: NO), the flow proceeds to Step S18, and search for whether or not the mobile device 300 is in a left region within the rear part of the vehicle interior R is started.

In this case, as well as Step S12 described above, the specific ID information for recognizing the mobile device 300 stored in the storage unit 11 is extracted under the control of the control unit 1. The search signal including the ID information is transmitted from the interior signal transmitting and receiving unit 6b.

A radio wave for disturbing the search signal transmitted from the interior signal transmitting and receiving unit 6b is transmitted from the interior signal transmitting and receiving unit 6c provided in the right part of the vehicle interior R.

Figure 10:
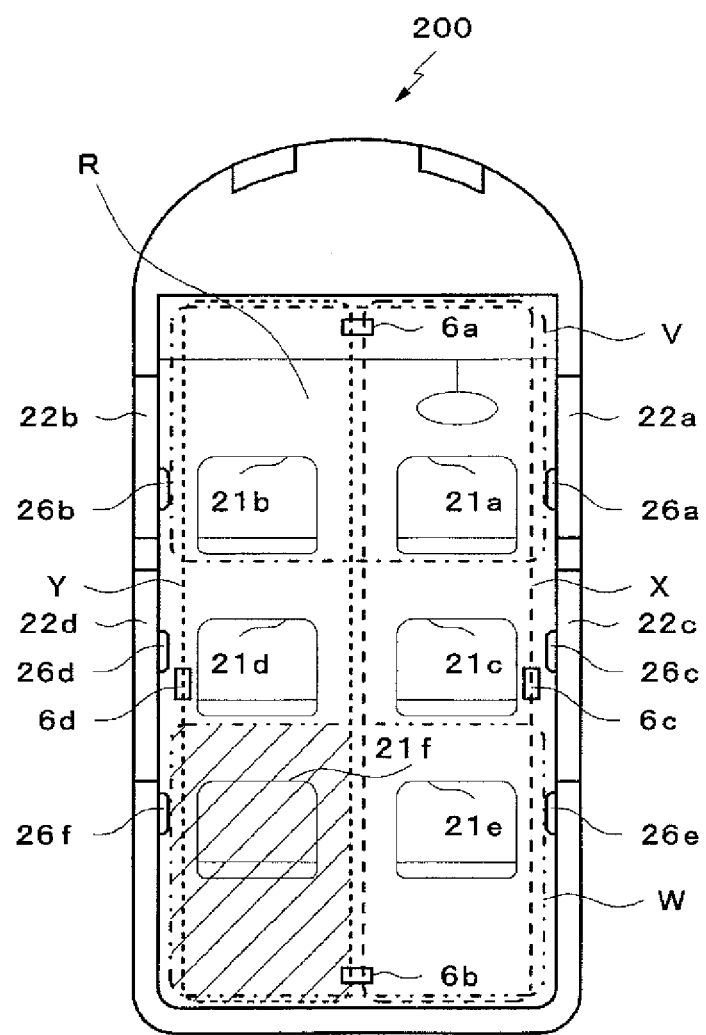
FIG. 10 is a view showing a search range of the mobile device.

Therefore, although the left region within the rear part of the vehicle interior R is not influenced by the disturbing radio wave transmitted from the interior signal transmitting and receiving unit 6c, the right region is influenced by the disturbing radio wave transmitted from the interior signal transmitting and receiving unit 6c. Thus, a search range of the mobile device 300 in Step S18 is limited to the rear left region of the vehicle interior R as shown by a shaded part in FIG. 10.

In Step S19, in a case where the mobile device 300 replies to the vehicle control device 100 (Step S19: YES), the flow proceeds to Step S20. In a case where there is no reply (Step S19: NO), the flow proceeds to Step S22 of FIG. 15.

"YES" is chosen in Step S19 in a case where the mobile device 300 is in the rear left region of the vehicle interior R (shaded region of FIG. 10), and "NO" is chosen in a case where the mobile device is not in the rear left region of the vehicle interior R.

However, in Step S15, it is already confirmed that the mobile device 300 is not in the rear right part of the vehicle interior R (Step S15: NO). Therefore, in general, "NO" confirming that the mobile device 300 is neither in the rear right part nor in a rear left part of the vehicle interior R cannot be chosen in Step S19.

Thus, in a case of the above result, it is determined that "YES" is chosen in Step S13 because the mobile device 300 is in the vicinity of a border between the rear part of the vehicle interior R and the center part of the vehicle interior R, the search signal transmitted from the interior signal transmitting and receiving unit 6b is coincidentally received by the mobile device 300, and the mobile device 300 replies. In order to continuously search the mobile device 300, the flow proceeds to Step S22 of FIG. 15.

In Step S20, based on the reply from the mobile device 300 in Step S13 (Step S13: YES) and the reply from the mobile device 300 in Step S19 (Step S19: YES), it is determined that the mobile device 300 is left in the vehicle interior R and the position of the mobile device 300 is identified to be the rear left part of the vehicle interior R.

When it is determined that the mobile device 300 is left, the all-together locking of the doors 22a to 22d based on the locking operation in Step S1 is also inhibited.

In Step S21, an interior lamp among the interior lamps 24 (FIG. 1), the interior lamp being close to the position of the mobile device 300 (in the rear left part) identified in Step S20 is lit.

In this case, the position of the mobile device 300 is identified to be the rear left part of the vehicle interior R in Step S20. Thus, a signal including information of the third row seat 21f within the region is outputted from the control unit 1 to the interior lamp drive control unit 12.

Based on this signal, the interior lamp drive control unit 12 drives and controls to light the interior light 25c provided on the upper side (ceiling C) of the row of the seat 21f (refer to FIG. 4C), the side light 26f provided on the side of the seat 21f (on the inner side of the vehicle 200), and the foot light 27f provided on the lower side (floor F), so as to light these interior lamps 24. When the above interior lamps 24 are lit, the flow is finished.

In a case where there is no reply from the mobile device 300 (Step S3: NO, Step S5: NO, and Step S9: NO) upon the search in the front part of the vehicle interior R, and there is no reply from the mobile device 300 (Step S13: NO, Step S15: NO, and Step S19: NO) upon the search in the rear part of the vehicle interior R, the flow proceeds to Step S22 of FIG. 15. In Step S22, search of the mobile device 300 in the center part of the vehicle interior R is started.

In this case, as well as Step S2 or the like described above, the specific ID information for recognizing the mobile device 300 stored in the storage unit 11 is extracted under the control of the control unit 1. The search signal including the ID information is transmitted from the interior signal transmitting and receiving unit 6c provided on the right side of the center part of the vehicle interior R.

Radio waves for disturbing the search signal transmitted from the interior signal transmitting and receiving unit 6c are transmitted from the interior signal transmitting and receiving unit 6a provided in the front part of the vehicle interior R and the interior signal transmitting and receiving unit 6b provided in the rear part.

Figure 11:
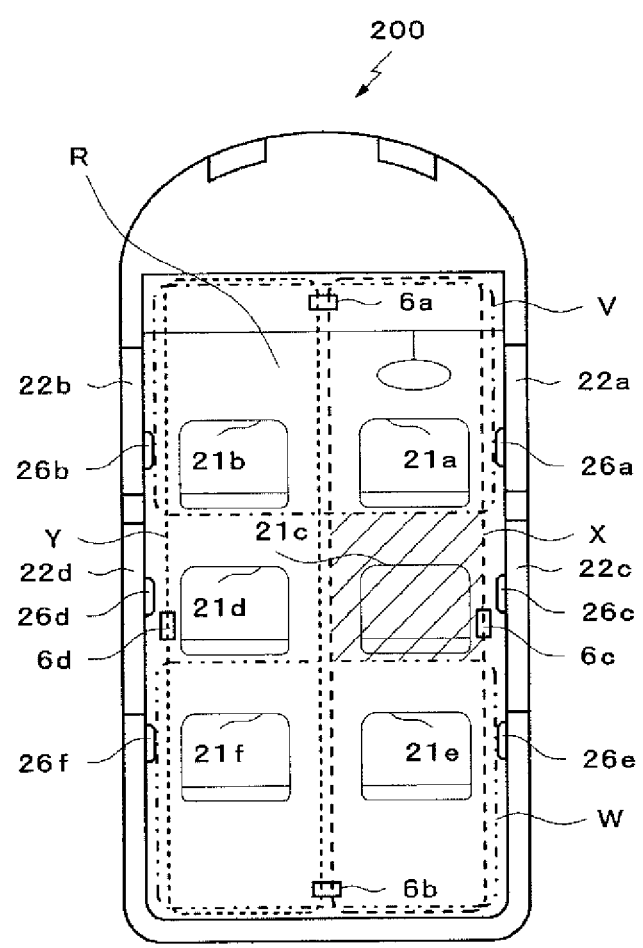
FIG. 11 is a view showing a search range of the mobile device.

Therefore, although the center part within the right region of the vehicle interior R is not influenced by the disturbing radio waves transmitted from the interior signal transmitting and receiving unit 6a and the interior signal transmitting and receiving unit 6b, the front part is influenced by the disturbing radio wave transmitted from the interior signal transmitting and receiving unit 6a, and the rear part is influenced by the disturbing radio wave transmitted from the interior signal transmitting and receiving unit 6b. Therefore, a search range of the mobile device 300 in Step S22 is limited to the center right region of the vehicle interior R as shown by a shaded part in FIG. 11.

In Step S23, in a case where the mobile device 300 replies to the vehicle control device 100 (Step S23: YES), the flow proceeds to Step S24. In a case where there is no reply (Step S23: NO), the flow proceeds to Step S26.

"YES" is chosen in Step S23 in a case where the mobile device 300 is in the center right region of the vehicle interior R (shaded region of FIG. 11), and "NO" is chosen in a case where the mobile device 300 is not in the center right region of the vehicle interior R.

In Step S24, based on the reply from the mobile device 300 in Step S23 (Step S23: YES), it is determined that the mobile device 300 is left in the vehicle interior R and the position of the mobile device 300 is identified to be a center right part of the vehicle interior R.

When it is determined that the mobile device 300 is left, the all-together locking of the doors 22a to 22d based on the locking operation in Step S1 is also inhibited.

In Step S25, an interior lamp among the interior lamps 24 (FIG. 1), the interior lamp being close to the position of the mobile device 300 (in the center right part) identified in Step S24 is lit.

In this case, the position of the mobile device 300 is identified to be the center right part of the vehicle interior R in Step S24. Thus, a signal including information of the second row seat 21c within the region is outputted from the control unit 1 to the interior lamp drive control unit 12.

Based on this signal, the interior lamp drive control unit 12 drives and controls to light the interior light 25b provided on the upper side (ceiling C) of the row of the seat 21c (refer to FIG. 4B), the side light 26c provided on the side of the seat 21c (on the inner side of the door 22c), and the foot light 27c provided on the lower side (floor F), so as to light these interior lamps 24. When the above interior lamps 24 are lit, the flow is finished.

Returning to Step S23, in a case where there is no reply from the mobile device 300 (Step S23: NO), the flow proceeds to Step S26, and search for whether or not the mobile device 300 is in the left region within the center part of the vehicle interior R is started.

In this case, as well as Step S22 or the like described above, the specific ID information for recognizing the mobile device 300 stored in the storage unit 11 is extracted under the control of the control unit 1. The search signal including the ID information is transmitted from the interior signal transmitting and receiving unit 6d provided on the left side of the center part of the vehicle interior R.

Radio waves for disturbing the search signal transmitted from the interior signal transmitting and receiving unit 6d are transmitted from the interior signal transmitting and receiving unit 6a provided in the front part of the vehicle interior R and the interior signal transmitting and receiving unit 6b provided in the rear part.

Figure 12:
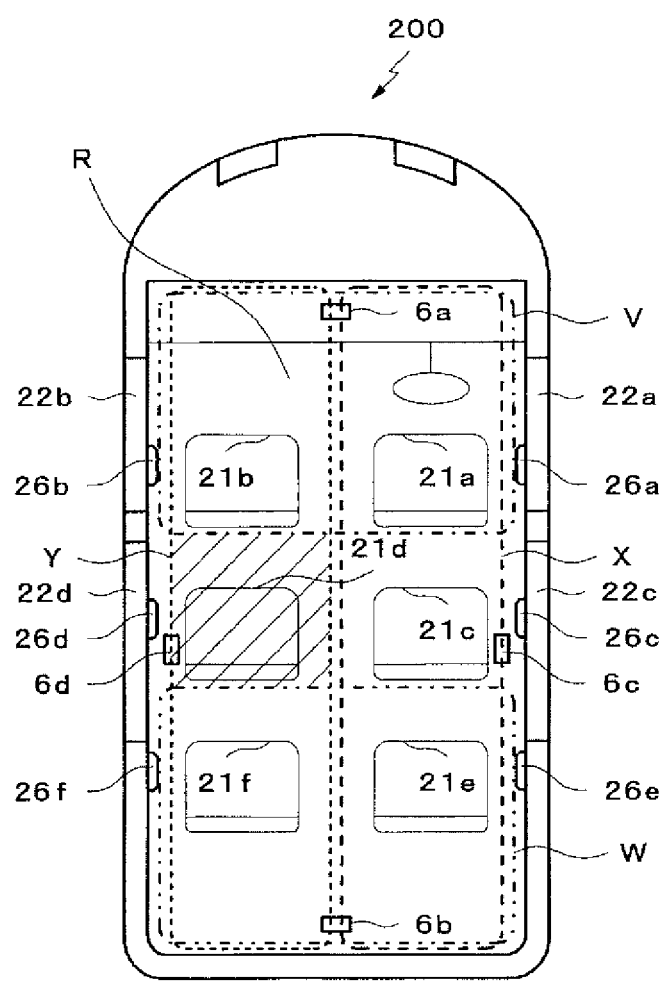
FIG. 12 is a view showing a search range of the mobile device.

Therefore, although the center part within the left region of the vehicle interior R is not influenced by the disturbing radio waves transmitted from the interior signal transmitting and receiving unit 6a and the interior signal transmitting and receiving unit 6b, the front part is influenced by the disturbing radio wave transmitted from the interior signal transmitting and receiving unit 6a, and the rear part is influenced by the disturbing radio wave transmitted from the interior signal transmitting and receiving unit 6b. Therefore, a search range of the mobile device 300 in Step S26 is limited to the center left region of the vehicle interior R as shown by a shaded part in FIG. 12.

In Step S27, in a case where the mobile device 300 replies to the vehicle control device 100 (Step S27: YES), the flow proceeds to Step S28. In a case where there is no reply (Step S27: NO), the flow is finished.

"YES" is chosen in Step S27 in a case where the mobile device 300 is in the center left region of the vehicle interior R (shaded region of FIG. 12), and "NO" is chosen in a case where the mobile device is not in the center left region of the vehicle interior R.

However, in Step S23, it is already confirmed that the mobile device 300 is not in the center right part of the vehicle interior R (Step S23: NO).

In Step S5 of FIG. 13, it is already confirmed that the mobile device 300 is not in the front right part of the vehicle interior R (Step S5: NO), and in Step S9, it is already confirmed that the mobile device 300 is not in the front left part of the vehicle interior R (Step S9: NO).

Figure 14:
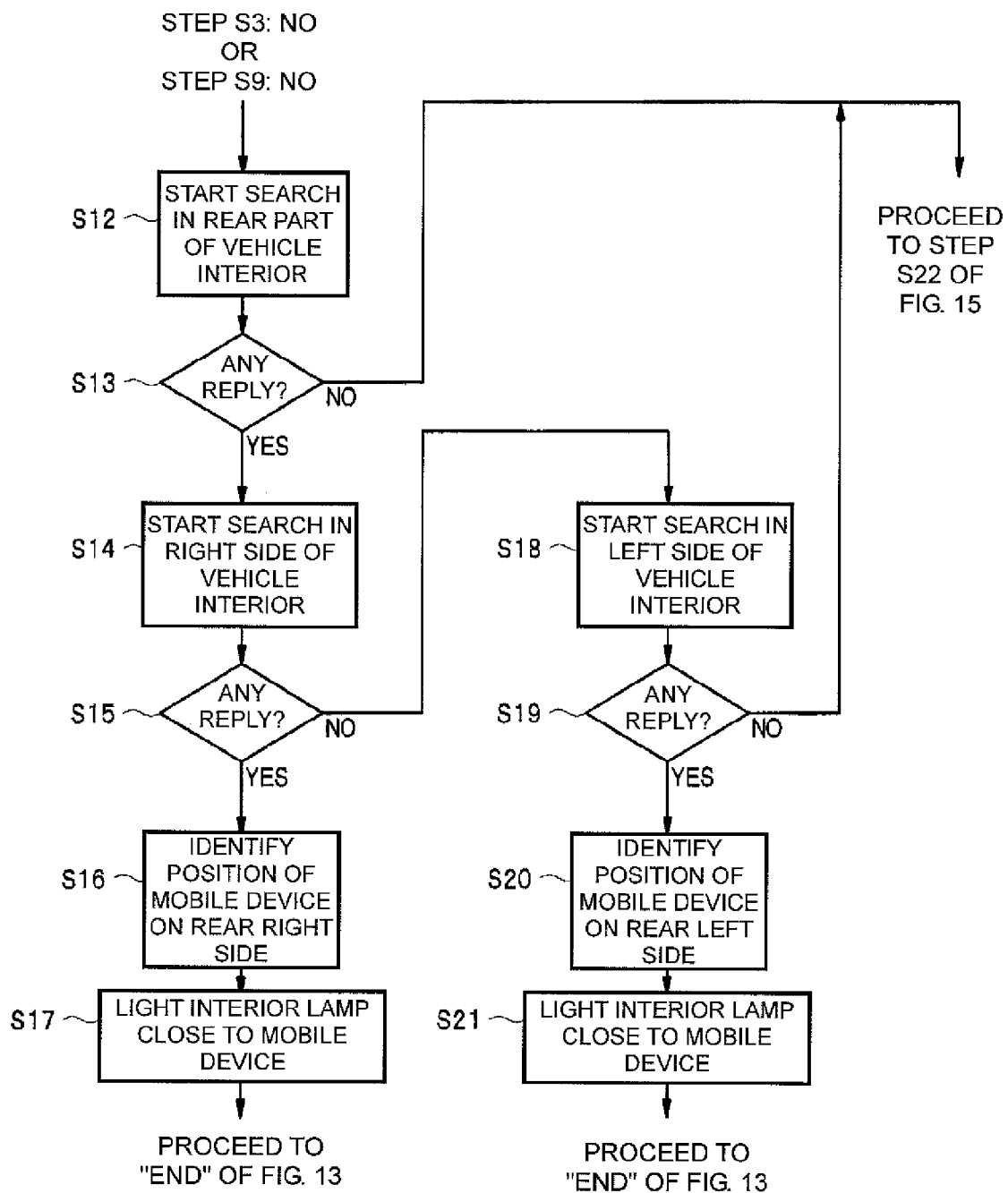
FIG. 14 is a flowchart showing actions at the time of searching the mobile device.
Figure 15:
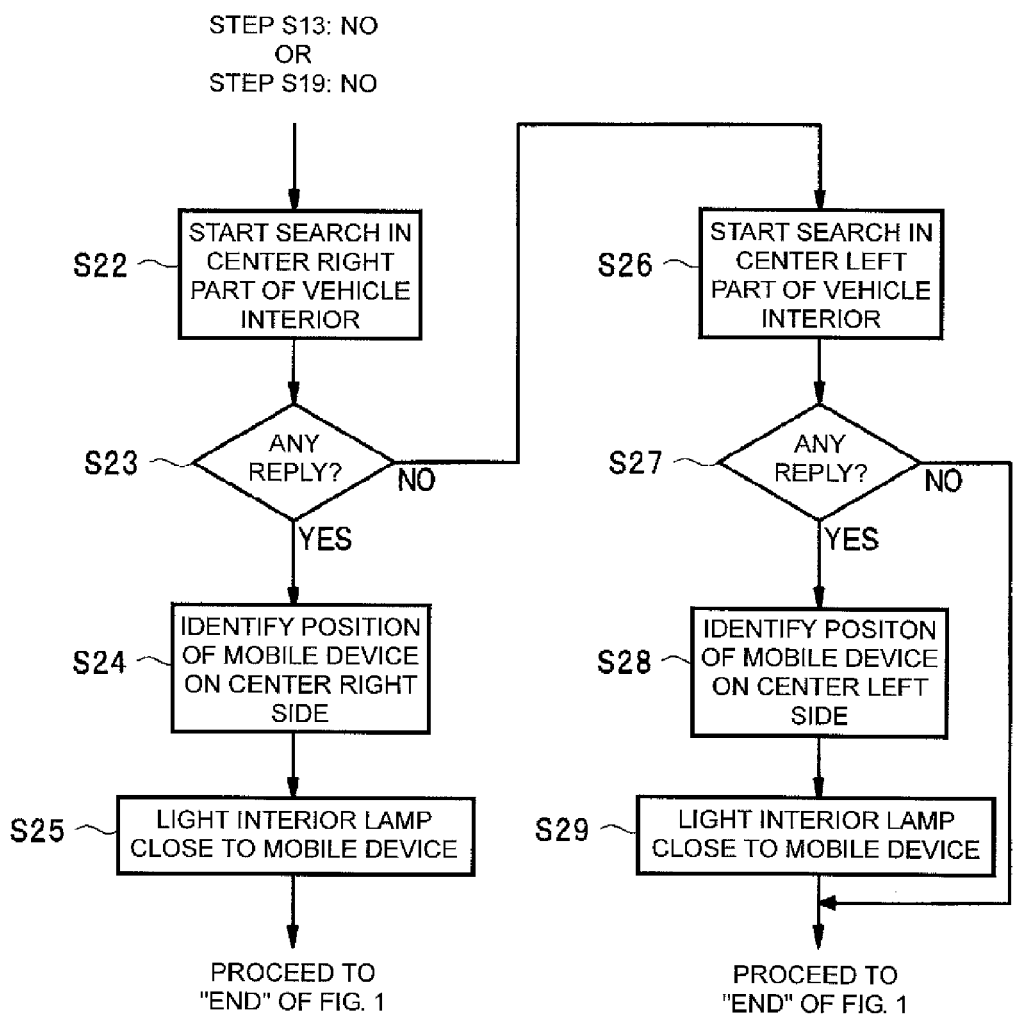
FIG. 15 is a flowchart showing actions at the time of searching the mobile device.

Further, in Step S15 of FIG. 14, it is already confirmed that the mobile device 300 is not in the rear right part of the vehicle interior R (Step S15: NO), and in Step S19, it is already confirmed that the mobile device 300 is not in the rear left part of the vehicle interior R (Step S19: NO).

In a case where there is no reply from the mobile device 300 (Step S3 of FIG. 13: NO) upon the search in the front part of the vehicle interior R, there is no reply from the mobile device 300 (Step S13 of FIG. 14: NO) upon the search in the rear part of the vehicle interior R, and there is no reply from the mobile device 300 (Step S23 of FIG. 15: NO, and Step S27: NO) upon the search in the center part of the vehicle interior R, it is determined that the mobile device 300 is not in the vehicle interior R, and the flow is finished. Since the mobile device 300 is not left in the vehicle interior R, as described above, the all-together locking of the doors 22a to 22d is performed based on the locking operation in Step S1.

However, in other cases, in general, "NO" confirming that the mobile device 300 is nowhere in the vehicle interior R although the mobile device 300 replies at least once cannot be chosen in Step S27.

Therefore, in a case of the above result, it is determined that a certain error (malfunction) is generated on the side of the vehicle control device 100. In order to finish the search of the mobile device 300, the flow is finished.

In Step S28, based on the reply from the mobile device 300 in Step S27 (Step S27: YES), it is determined that the mobile device 300 is left in the vehicle interior R and the position of the mobile device 300 is identified to be a center left part of the vehicle interior R.

When it is determined that the mobile device 300 is left, the all-together locking of the doors 22a to 22d based on the locking operation in Step S1 is also inhibited.

In Step S29, an interior lamp among the interior lamps 24 (FIG. 1), the interior lamp being close to the position of the mobile device 300 (in the center left part) identified in Step S28 is lit.

In this case, the position of the mobile device 300 is identified to be the center left part of the vehicle interior R in Step S28. Thus, a signal including information of the second row seat 21d within the region is outputted from the control unit 1 to the interior lamp drive control unit 12.

Based on this signal, the interior lamp drive control unit 12 drives and controls to light the interior light 25b provided on the upper side (ceiling C) of the row of the seat 21d (refer to FIG. 4B), the side light 26d provided on the side of the seat 21d (on the inner side of the door 22d), and the foot light 27d provided on the lower side (floor F), so as to light these interior lamps 24. When the above interior lamps 24 are lit, the flow is finished.

As described above, according to one or more of the above embodiments, when the operation of locking the doors 22a to 22d (FIG. 1) is performed, the search of the mobile device 300 in the vehicle interior R is started. When the mobile device 300 is searched, the search signals and the disturbing radio waves are transmitted from the interior signal transmitting and receiving units 6a to 6d, so that the search is performed while dividing the vehicle interior R into the regions (shaded regions of FIGS. 7 to 12) (Steps S4, S8 of FIG. 13, Steps S14, S18 of FIG. 14, and Steps S22, S26 of FIG. 15). In a case where the position of the left mobile device 300 is identified, as shown in FIGS. 16A to 16C, the interior lamps 24 close to the position of the mobile device 300 are lit (Steps S7, S11 of FIG. 13, Steps S17, S21 of FIG. 14, and Steps S25, S29 of FIG. 15).

Accordingly, by confirming a lighting state of the interior lamps 24 after the locking operation, the user can readily confirm whether or not the mobile device 300 is left. In a case where the interior lamps 24 are lit, by confirming a lighting position of the interior lamps 24, the user can intuitively and readily confirm where the mobile device 300 is left. Particularly, when it is dark in an exterior of the vehicle 200, that is, when the mobile device 300 is not easily found out in an exterior environment, the interior lamps 24 brighten a place close to the position of the mobile device 300. Thus, the mobile device 300 is more easily found out.

Even after the user gets out of the vehicle, that is, even when a power source of the vehicle 200 is in an "OFF" state, the interior lamp drive control unit 12 is actuated with the mobile device 300 in the vehicle interior R. Thus, there is no need for re-operating the engine start operation unit 8 to bring the power source of the vehicle 200 into an "ACC (accessory)" or "ON" state. Thus, usability of the user is favorable.

Further, operations for notifying of the position of the mobile device 300 such as sound release and light emission are not performed on the side of the mobile device 300. Thus, an electric power consumption amount of the mobile device 300 can be suppressed, and shortening of the life of the power source unit 35 (battery) can be suppressed.

According to one or more of the above embodiments, for example when the position of the mobile device 300 is identified to be the front right part of the vehicle interior R, the signal including the information of the seat 21a close to the position of the mobile device 300 is outputted from the control unit 1 to the interior lamp drive control unit 12. Based on this signal, the interior lamp drive control unit 12 drives and controls to light the interior light 25a among the plurality of interior lights 25a to 25c provided on the ceiling C, the interior light being provided on the upper side (ceiling C) of the row of the seat 21a, so as to light the interior light 25a (refer to FIGS. 16A to 16C).

Accordingly, by confirming a position of the interior light 25a which is solely lit among the plurality of interior lights 25a to 25c provided on the ceiling C, the user can more easily identify the position of the mobile device 300. Thus, the mobile device 300 can be readily found out.

According to one or more of the above embodiments, for example when the position of the mobile device 300 is identified to be the front right part of the vehicle interior R, in addition to the above interior light 25a, the side light 26a among the plurality of side lights 26a to 26f provided on the side of the seats (seats 21a to 21f), the side light being provided on the side of the seat 21a (on the inner side of the door 22a) is lit, and the foot light 27a among the plurality of foot lights 27a to 27f provided on the lower side of the seats (seats 21a to 21f), the foot light being provided on the lower side (floor F) of the seat 21a is lit (refer to FIGS. 16A to 16C).

Accordingly, the place close to the position of the mobile device 300 is brightened by the plurality of lit interior lamps 24 (the interior light 25a, the side light 26a, and the foot light 27a). Thus, when it is dark in the exterior of the vehicle 200, that is, when the mobile device 300 is not easily found out in the exterior environment, the mobile device 300 is more easily found out.

Figure 7:
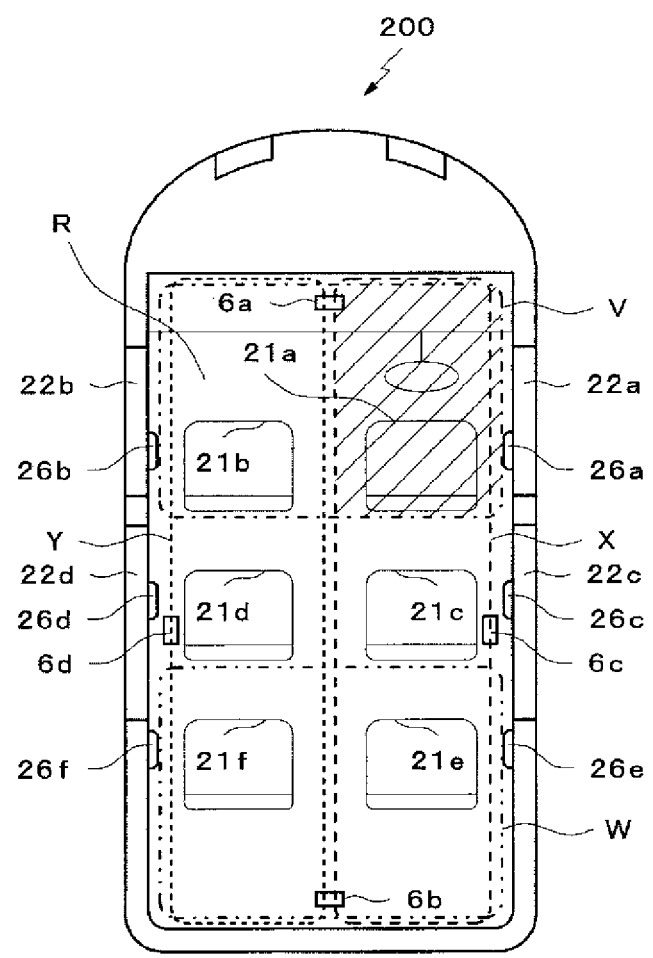
FIG. 7 is a view showing a search range of the mobile device.

Since the seat corresponding to the lit side light 26a, and the lit foot light 27a is the seat 21a, it is soon found out that the place (region) at which the mobile device 300 is placed is the right front region of the vehicle interior R (shaded region of FIG. 7). Therefore, the mobile device 300 can be more readily found out within a narrower range.

By providing the side light 26a on the side of the seat 21a (on the inner side of the door 22a), light of the side light 26a can also be prevented from being blocked by a body of a searcher (user).

Further, in a case where the position of the mobile device 300 is on the lower side of the seat 21a, a part below the seat 21a can be more brightened by the foot light 27a provided in the floor F. Therefore, when it is dark in the exterior of the vehicle 200, that is, when the mobile device 300 is not easily found out in the exterior environment, the mobile device 300 is more easily found out.

As a first modified example, for example, the interior lamps 24 may be provided on the ceiling C corresponding to each of the seats (seats 21a to 21f). Only an interior light among these interior lights, the interior light being the closest to the position of the mobile device 300 may be lit by the interior lamp drive control unit 12.

Accordingly, by confirming the position of the seat corresponding to the lit interior light, the place (region) at which the mobile device 300 is placed can be identified within a narrower range. Thus, the mobile device 300 can be more readily found out.

As a second modified example, for example, the timekeeping unit 10 may start timekeeping from a time point when the interior lamp 24 close to the position of the mobile device 300 is lit (Steps S7, S11 of FIG. 13, Steps S17, S21 of FIG. 14, and Steps S25, S29 of FIG. 15), and the interior lamp drive control unit 12 may turns off the lit interior lamp 24 in a case where a timekeeping time by the timekeeping unit 10 exceeds a predetermined time.

Accordingly, even in a case where the user gets away from the vehicle 200 while not knowing that the mobile device 300 is left, by turning off the lit interior lamp 24 after a predetermined time, the mobile device 300 left in the vehicle interior R can be prevented from being detected from the outside. That is, theft from the vehicle 200 is prevented. By turning off the lit interior lamp 24 after a predetermined time, wasteful consumption of the electric power (dead battery) can be prevented.

As a third modified example, for example, only in a case where after the position of the mobile device 300 is identified among the regions of the vehicle interior R, the locking operation unit 2a or the locking operation unit 2b is operated by the user, the interior lamps 24 close to the position of the mobile device 300 may be lit.

Accordingly, even in a case where the user gets away from the vehicle 200 while not knowing that the mobile device 300 is left, the left mobile device 300 can be prevented from being detected from the outside due to lighting of the interior lamps 24. That is, the theft from the vehicle 200 is prevented. In a case where the user returns to the vehicle 200 and operates the locking operation unit 2a or the locking operation unit 2b again, the interior lamps 24 close to the position of the mobile device 300 are lit. Thus, the user can be notified that the mobile device 300 is left.

Further, as a fourth modified example, for example, only in a case where after the position of the mobile device 300 is identified among the regions of the vehicle interior R, opening of the corresponding doors (doors 22a to 22d) is detected by at least one of the open/close detection units 5a to 5d, the interior lamps 24 close to the position of the mobile device 300 may be lit.

Accordingly, even in a case where the user gets away from the vehicle 200 while not knowing that the mobile device 300 is left, the left mobile device 300 can be prevented from being detected from the outside due to lighting of the interior lamps 24. That is, the theft from the vehicle 200 is prevented. In a case where the user returns to the vehicle 200 and opens at least one of the doors 22a to 22d, the interior lamps 24 close to the position of the mobile device 300 are lit. Thus, the user can be notified that the mobile device 300 is left.

Various embodiments other than the above embodiments can be adopted. For example, in one or more of the above embodiments, the vehicle control device 100 is applied to the vehicle 200 having six seats in three rows. However, the present invention is not limited to this but the vehicle control device can be applied to a vehicle having four seats in two rows, a vehicle having eight seats in four rows, or the like irrespective of the number of seats in one row and the number of seat rows in one vehicle.

In one or more of the above embodiments, the search of the mobile device is performed for each of the regions in the vehicle from the beginning. However, whether or not the mobile device is left may be firstly searched over the entire vehicle, and then in a case where the mobile device is detected, the search of the mobile device is performed for each of the regions in the vehicle.

In one or more of the above embodiments, the search signals and the disturbing radio waves are transmitted from the interior signal transmitting and receiving units 6a to 6d, so that the search is performed while dividing the vehicle interior R into the regions (FIGS. 7 to 12). However, by setting directivity of the antennas of the interior signal transmitting and receiving units 6a to 6d in accordance with the regions, the mobile device 300 may be searched only with the search signals without transmitting the disturbing radio waves.

Further, in one or more of the above embodiments, the search signals are transmitted from the interior signal transmitting and receiving units 6a to 6d, so as to detect the position of the mobile device 300 left in the vehicle interior R. However, detection means of the position of the mobile device 300 is not limited to the above. For example, in place of the interior signal transmitting and receiving units 6a to 6d, the mobile device 300 may be provided with a GPS (Global Positioning System) transmitter, and the vehicle control device 100 may be provided with a GPS transmitter and a GPS receiver. Position information of the vehicle control device 100 and the position information of the mobile device 300 may be received on the side of the vehicle control device 100, and the position of the mobile device 300 in the vehicle interior R may be detected based on the two received position information.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle control device mounted on a vehicle for performing communication with a mobile device and performing predetermined control in accordance with communication contents with the mobile device, comprising:
    operation means for locking or unlocking doors of the vehicle;
    position detection means for detecting a position of the mobile device left in an interior of the vehicle in a case where a locking operation is performed by the operation means; and
    interior lamp control means for lighting an interior lamp among a plurality of interior lamps provided in the interior of the vehicle,
    wherein the interior lamp is close to the position of the mobile device based on information of the position detected by the position detection means, and
    wherein the interior lamp is a ceiling lamp provided on a ceiling of the vehicle or a floor lamp provided on a floor of the vehicle.

2. The vehicle control device according to claim 1, wherein the interior lamp control means lights only an interior lamp among the plurality of interior lamps, the interior lamp being the closest to the position of the mobile device.

3. The vehicle control device according to claim 1, wherein the interior lamp control means lights plural interior lamps among the plurality of interior lamps, the interior lamps being close to the position of the mobile device.

4. The vehicle control device according to claim 1,
    wherein the plurality of interior lamps is provided corresponding to rows of a plurality of seats arranged in the interior of the vehicle on the upper side of the rows, and
    wherein the interior lamp control means lights only an interior lamp among the plurality of interior lamps provided on the upper side of the rows, the interior lamp being the closest to the position of the mobile device based on the information of the position detected by the position detection means.

5. The vehicle control device according to claim 1,
    wherein the plurality of interior lamps is provided respectively corresponding to a plurality of seats arranged in the interior of the vehicle on the upper side of the seats, and
    wherein the interior lamp control means lights only an interior lamp among the plurality of interior lamps provided on the upper side of the seats, the interior lamp being the closest to the position of the mobile device based on the information of the position detected by the position detection means.

6. The vehicle control device according to claim 1,
    wherein the plurality of interior lamps is provided respectively corresponding to a plurality of seats arranged in the interior of the vehicle on the side of the seats, and
    wherein the interior lamp control means lights only an interior lamp among the plurality of interior lamps provided on the side of the seats, the interior lamp being the closest to the position of the mobile device based on the information of the position detected by the position detection means.

7. The vehicle control device according to claim 1,
    wherein the plurality of interior lamps is provided respectively corresponding to a plurality of seats arranged in the interior of the vehicle on the lower side of the seats, and
    wherein the interior lamp control means lights only an interior lamp among the plurality of interior lamps provided on the lower side of the seats, the interior lamp being the closest to the position of the mobile device based on the information of the position detected by the position detection means.

8. The vehicle control device according to claim 1, further comprising:
    timekeeping means,
    wherein the time keeping means starts timekeeping based on lighting of the interior lamp by the interior lamp control means, and
    wherein the interior lamp control means turns off the lit interior lamp in a case where a timekeeping time by the timekeeping means exceeds a predetermined time.

9. The vehicle control device according to claim 1, wherein the interior lamp control means lights the interior lamp only in a case where after the position detection means detects the position of the mobile device, an operation of the operation means is performed.

10. The vehicle control device according to claim 1, further comprising:
    open/close detection means for detecting opening/closing of the doors of the vehicle,
    wherein the interior lamp control means lights the interior lamp only in a case where after the position detection means detects the position of the mobile device, the open/close detection means detects that the doors of the vehicle are opened.

11. A vehicle control device mounted on a vehicle for performing communication with a mobile device and performing predetermined control in accordance with communication contents with the mobile device, comprising:
    a locking operation unit that locks or unlocks doors of the vehicle;
    interior signal transmitting and receiving units that detect a position of the mobile device left in an interior of the vehicle in a case where a locking operation is performed by the locking operation unit; and
    an interior lamp drive control unit that lights an interior lamp among a plurality of interior lamps provided in the interior of the vehicle,
    wherein the interior lamp is close to the position of the mobile device based on information of the position detected by the interior signal transmitting and receiving units, and
    wherein the interior lamp is a ceiling lamp provided on a ceiling of the vehicle or a floor lamp provided on a floor of the vehicle.

12. The vehicle control device according to claim 11, wherein the interior lamp drive control unit lights only an interior lamp among the plurality of interior lamps, the interior lamp being the closest to the position of the mobile device.

13. The vehicle control device according to claim 11, wherein the interior lamp drive control unit lights plural interior lamps among the plurality of interior lamps, the interior lamps being close to the position of the mobile device.

14. A vehicle control device mounted on a vehicle for performing communication with a mobile device and performing predetermined control in accordance with communication contents with the mobile device, comprising:
 a locking operation unit that locks or unlocks doors of the vehicle;
 interior signal transmitting and receiving units that detect a position of the mobile device left in an interior of the vehicle in a case where a locking operation is performed by the locking operation unit; and
 an interior lamp drive control unit that lights an interior lamp among a plurality of interior lamps provided in the interior of the vehicle,
 wherein the interior lamp is close to the position of the mobile device based on information of the position detected by the interior signal transmitting and receiving units,
 wherein the plurality of interior lamps is provided corresponding to rows of a plurality of seats arranged in the interior of the vehicle on the upper side of the rows, and
 wherein the interior lamp drive control unit lights only an interior lamp among the plurality of interior lamps provided on the upper side of the rows, the interior lamp being the closest to the position of the mobile device based on the information of the position detected by the interior signal transmitting and receiving units.

15. The vehicle control device according to claim 11, wherein the plurality of interior lamps is provided respectively corresponding to a plurality of seats arranged in the interior of the vehicle on the upper side of the seats, and
 wherein the interior lamp drive control unit lights only an interior lamp among the plurality of interior lamps provided on the upper side of the seats, the interior lamp being the closest to the position of the mobile device based on the information of the position detected by the interior signal transmitting and receiving units.

16. The vehicle control device according to claim 11, wherein the plurality of interior lamps is provided respectively corresponding to a plurality of seats arranged in the interior of the vehicle on the side of the seats, and
 wherein the interior lamp drive control unit lights only an interior lamp among the plurality of interior lamps provided on the side of the seats, the interior lamp being the closest to the position of the mobile device based on the information of the position detected by the interior signal transmitting and receiving units.

17. The vehicle control device according to claim 11, wherein the plurality of interior lamps is provided respectively corresponding to a plurality of seats arranged in the interior of the vehicle on the lower side of the seats, and
 wherein the interior lamp drive control unit lights only an interior lamp among the plurality of interior lamps provided on the lower side of the seats, the interior lamp being the closest to the position of the mobile device based on the information of the position detected by the interior signal transmitting and receiving units.

18. The vehicle control device according to claim 11, further comprising:
 a timekeeping unit,
 wherein the time keeping unit starts timekeeping based on lighting of the interior lamp by the interior lamp drive control unit, and
 wherein the interior lamp drive control unit turns off the lit interior lamp in a case where a timekeeping time by the timekeeping unit exceeds a predetermined time.

19. The vehicle control device according to claim 11, wherein the interior lamp drive control unit lights the interior lamp only in a case where after the interior signal transmitting and receiving units detect the position of the mobile device, an operation of the locking operation units is performed.

20. The vehicle control device according to claim 11, further comprising:
 open/close detection units for detecting opening/closing of the doors of the vehicle,
 wherein the interior lamp drive control unit lights the interior lamp only in a case where after the interior signal transmitting and receiving units detect the position of the mobile device, the open/close detection units detect that the doors of the vehicle are opened.

\* \* \* \* \*